(12) United States Patent
Kinjo et al.

(10) Patent No.: US 9,621,046 B2
(45) Date of Patent: Apr. 11, 2017

(54) POWER CONVERTER FOR DRIVING A SWITCH BASED ON CURRENT COMMAND AND CURRENT FLOWING THEREIN

(71) Applicant: DENSO CORPORATION, Kariya, Aichi-pref. (JP)

(72) Inventors: Hirofumi Kinjo, Nagoya (JP); Keiji Shigeoka, Okazaki (JP); Yuji Hayashi, Kasugai (JP); Kimikazu Nakamura, Handa (JP)

(73) Assignee: DENSO CORPORATION, Kariya (JP)

( * ) Notice: Subject to any disclaimer, the term of this patent is extended or adjusted under 35 U.S.C. 154(b) by 193 days.

(21) Appl. No.: 13/743,745

(22) Filed: Jan. 17, 2013

(65) Prior Publication Data

US 2013/0300397 A1 Nov. 14, 2013

(30) Foreign Application Priority Data

Jan. 17, 2012 (JP) .................................. 2012-007310

(51) Int. Cl.
*H02M 3/335* (2006.01)
*H02M 3/24* (2006.01)
(Continued)

(52) U.S. Cl.
CPC .............. *H02M 3/24* (2013.01); *B60R 16/03* (2013.01); *H02M 3/3376* (2013.01); *H02M 3/33507* (2013.01)

(58) Field of Classification Search
CPC ............ H02M 3/00; H02M 3/22; H02M 3/24; H02M 3/28; H02M 3/325; H02M 3/335;
(Continued)

(56) References Cited

U.S. PATENT DOCUMENTS

2005/0035736 A1* 2/2005 Coutu ....................... H02P 8/12
318/696

FOREIGN PATENT DOCUMENTS

JP 2009-118571 5/2009
JP 2010259161 * 11/2010

OTHER PUBLICATIONS

English translation (JP2009118571).*
English translation (JP2010259161).*

* cited by examiner

*Primary Examiner* — Timothy J Dole
*Assistant Examiner* — Carlos Rivera-Perez
(74) *Attorney, Agent, or Firm* — Nixon & Vanderhye P.C.

(57) ABSTRACT

In a power converter, a reference signal generator generates a reference signal with a predetermined period. A current detector detects a current flowing in the converter. When a value of the detected current is larger than a value of a predetermined current command, a reset signal generator generates a reset signal. A driving unit drives a switch. The switch is turned on, and subsequently is turned off: (i) in synchronization with the reference signal when the reset signal is not outputted before the reference signal is outputted; and (ii) in synchronization with the reset signal when the reset signal is outputted before the reference signal is outputted. However, the switch is turned off in synchronization with the reset signal during a predetermined time including a first predetermined time before an output timing of the reference signal and a second predetermined time after the output timing of the reference signal.

9 Claims, 13 Drawing Sheets

(51) Int. Cl.
*B60R 16/03* (2006.01)
*H02M 3/337* (2006.01)

(58) Field of Classification Search
CPC ........... H02M 3/33507; H02M 3/3353; H02M 3/3376; H02M 3/33538; H02M 3/3546; H02M 3/33553; H02M 3/33569; H02M 3/33515; H02M 3/33523; H02M 3/156; H02M 3/158; H02M 2001/0009; H02M 2001/0038; H02M 2001/0041; H02M 1/32; H02M 1/38; H02M 1/36; H02M 1/325; H02M 7/48; H02M 7/53; H02M 7/537; H02M 7/5387; H02M 7/53871; H02M 7/53873; H02M 7/53875; H02M 7/53878; B60R 16/03; H02H 7/1213; H02H 7/122; H02H 7/08; H02H 7/083; H02H 7/093; H02H 7/0935
USPC ................ 323/222–226, 271–278, 282–287, 323/299–303, 351, 358, 205–211; 363/15–21.01, 21.04–21.18, 50–58, 78, 363/79, 89, 95–99, 131–134, 15–21.18, 363/40–43; 361/78–90, 18; 327/108–112, 333; 326/82, 83; 318/254, 318/400.3
See application file for complete search history.

POWER CONVERTER FOR DRIVING A SWITCH BASED ON CURRENT COMMAND AND CURRENT FLOWING THEREIN

CROSS-REFERENCE TO RELATED APPLICATION

This application is based on and claims the benefit of priority from earlier Japanese Patent Application No. 2012-007310 filed Jan. 17, 2012, the description of which is incorporated herein by reference.

BACKGROUND

Technical Field

The present invention relates to a power converter, which drives a switch on the basis of a current command and a current that flows therein.

Related Art

A DC (direct current) to DC converter (hereinafter referred to as "DC-DC converter") may be used as a power converter that drives a switch on the basis of a current command and a current that flows, as disclosed in, e.g., JP-A-2009-118571.

This DC-DC converter is adapted to control an output of a driving signal on the basis of a target current and a current flowing in a transformer so as to drive a transistor. The DC-DC converter includes a central processing unit (CPU), a digital to analog (D/A) converter, a current sensor, an absolute value circuit, a comparator, a holding circuit, an AND circuit, and a driving circuit. The CPU generates a target current on the basis of a difference voltage between a target voltage and an output voltage. The D/A converter converts the generated target current to a voltage. The current sensor and the absolute value circuit detect an absolute value of a current flowing in a transformer and output the detected absolute as a voltage. The comparator compares the absolute value of the current flowing in the transformer with the target current. The CPU includes a pulse outputting section that outputs pulse signals with a predetermined duty cycle in a predetermined cycle. The holding circuit and the AND circuit control an output of a driving signal for a transistor on the basis of a comparison result of the comparator. If the absolute value of the current flowing in the transformer is smaller than the target current, the holding circuit and the AND circuit output the pulse signal of the pulse outputting section as the driving signal for the transistor. If the absolute value of the current flowing in the transformer is larger than the target current, the holding circuit and the AND circuit stop the output of the driving signal to the transistor. The driving circuit turns the transistor on and off on the basis of the driving signal outputted from the holding circuit and the AND circuit.

In addition, there is a DC-DC converter that controls the timing for turning a transistor off on the basis of a target current and a current flowing in a transformer. This DC-DC converter includes a reference signal generator, a current detector, a reset signal generator, and a driving unit. The reference signal generator generates a reference signal at every predetermined cycle and outputs the generated reference signal. The current detector detects an absolute value of a current flowing in a transformer and outputs the detected absolute value. The reset signal generator generates a reset signal on the basis of a result of a comparison between a target current and the absolute value of the current flowing in the transformer and outputs the generated reset signal. If the absolute value of the current flowing in the transformer is larger than the target current, the reset signal generator outputs the reset signal. The driving unit turns a transistor on in synchronization with the reference signal. If the reset signal is outputted before the subsequent reference signal is outputted, the driving unit turns the transistor off in synchronization with the reset signal. If the reset signal is not outputted before the subsequent reference signal is outputted, the driving unit turns the transistor off in synchronization with the subsequent reference signal.

In the current detector, there is a delay between when the input current is detected and when it is outputted. In the reset signal generator also, there is a delay until the reset signal is outputted. Due to these delays, an output timing of the reset signal is delayed. Thus, the reset signal, which is needed to be outputted immediately before the reference signal is outputted, becomes outputted immediately after the reference signal is outputted. As a result, the transistor, which is turned on in synchronization with the reference signal, becomes turned off in synchronization with the reset signal which is outputted immediately after the reference signal is outputted due to these delays. That is, the transistor performs a switching operation different from the desired switching operation. In this case, a current that originally flows does not flow, and then, an input current and an output voltage are greatly fluctuated.

In addition, in the driving unit, there is a delay between when the reset signal is detected and when the transistor is turned off. In the transistor also, there is a delay until it is turned off. Due to this, even when the reset signal is outputted immediately before the reference signal is outputted, the transistor that is turned on in synchronization with the reference signal may become turned off immediately after the reference signal is outputted due to these delays. That is, the transistor performs a switching operation different from the desired switching operation. In this case also, a current that originally flows does not flow, and then, an input current and an output voltage are greatly fluctuated.

SUMMARY

An exemplary embodiment provides a power converter which is able to reduce a fluctuation of an input current or the like, even when a delay occurs in the current detector or the like.

According to an exemplary aspect of the present disclosure, there is provided a power converter, comprising: a reference signal generator configured to generate a reference signal with a predetermined period and output the reference signal; a current detector configured to detect a current flowing in the power converter and output a value of the detected current; a reset signal generator configured to generate a reset signal when the value of the detected current is larger than a value of a predetermined current command, and output the reset signal; and a driving unit configured to drive a switch provided in the power converter such that: (i) the switch is turned on, and subsequently is turned off: (a) in synchronization with the reference signal when the reset signal is not outputted before the reference signal is outputted; and (b) in synchronization with the reset signal when the reset signal is outputted before the reference signal is outputted; but (ii) the switch is not turned off in synchronization with the reset signal during a predetermined time including a first predetermined time before an output timing of the reference signal and a second predetermined time after the output timing of the reference signal.

According to this configuration, even when the reset signal, which needs to be outputted immediately before the reference signal, is outputted immediately after the reference signal is outputted due to delays of the input current detector and the reset signal generator, the switch can be controlled so as not to be turned off in synchronization with the reset signal outputted immediately after the reference signal is outputted.

In addition, even when the reset signal is outputted immediately before the reference signal is outputted, the switch can be controlled so as not to be turned off immediately after the reference signal is outputted due to delays of the driving unit and the switch. This can prevent an occurrence of a switching operation which is different from the desired switching operation and is caused by delays of e.g., the current detector, thereby making it possible to suppress a fluctuation of the input current or the like, even when a delay occurs in the current detector or the like.

The current detector may be configured to force an output of the current detector to be set to zero during the predetermined time including the first predetermined time before the output timing of the reference signal and the second predetermined time after the output timing of the reference signal.

According to this configuration, the output of the reset signal can be set to zero during a predetermined time including the first predetermined time before the output timing of the reference signal and the second predetermined time after the output timing of the reference signal. Thus, the switch can be reliably controlled so as not to be turned off in synchronization with the reset signal during the predetermined time including the first predetermined time before the output timing of the reference signal and the second predetermined time after the output timing of the reference signal.

The current detector may include: a mask signal generator configured to generate a mask signal on the basis of a set mask time; and a mask unit configured to force the output of the current detector to be set to zero on the basis of the mask signal.

According to this configuration, the output of the current detector can be forced to be set to zero during the predetermined time including the first predetermined time before the output timing of the reference signal and the second predetermined time after the output timing of the reference signal.

The reset signal generator may be configured to force an output of the reset signal generator to be set to zero during the predetermined time including the first predetermined time before the output timing of the reference signal and the second predetermined time after the output timing of the reference signal.

According to this configuration, the switch can be reliably controlled so as not to be turned off in synchronization with the reset signal during the predetermined time including the first predetermined time before the output timing of the reference signal and the second predetermined time after the output timing of the reference signal.

The reset signal generator may include: a mask signal generator configured to generate a mask signal on the basis of a set mask time; and a mask unit configured to force the output of the reset signal generator to be set to zero on the basis of the mask signal.

According to this configuration, the output of the reset signal generator can be forced to be set to zero during the predetermined time including the first predetermined time before the output timing of the reference signal and the second predetermined time after the output timing of the reference signal.

The predetermined time may be determined by a delay time of at least one of the current detector, the reset signal generator, and the driving unit.

This configuration can prevent an occurrence of a switching operation which is different from the desired switching operation and is caused by delays of e.g., the current detector.

The switch may be a switch circuit configured by a full-bridge connection of four switches which are configured as two sets of two diagonally arranged switches.

According to this configuration, in the power converter with the switch circuit configured by the full-bridge connection of four switches, a fluctuation of the input current or the like can be suppressed, even when a delay occurs in the current detector or the like.

In the switch circuit, an on-period of the respective switches diagonally arranged may be controlled by a regulation of a phase of an on-period of one of the two diagonally arranged switches within each pair with respect to that of an on-period of the other of the two diagonally arranged switches within the same pair.

According to this configuration, in the power converter using so called a phase shift control method, a fluctuation of the input current or the like can be suppressed, even when a delay occurs in the current detector or the like.

The reset signal generator may include: two comparators configured to generate a discrete reset signal at each two diagonally arranged switches and output the reset signal.

According to this configuration, in the power converter with two comparators configured to generate a discrete reset signal at each two diagonally arranged switches and output the reset signal, a fluctuation of the input current or the like can be suppressed, even when a delay occurs in the current detector or the like.

The power converter may be mounted in a vehicle.

According to this configuration, in the power converter mounted in the vehicle, a fluctuation of the input current or the like can be suppressed, even when a delay occurs in the current detector or the like.

DESCRIPTION OF EMBODIMENTS

Hereinafter, with reference to the accompanying drawings, exemplary embodiments of the present invention will be described. In these exemplary embodiments, a power converter of the present invention is applied to a DC-DC converter mounted in a vehicle. This DC-DC converter steps down a voltage of a battery in an isolated (insulated) manner and supplies the stepped down voltage to at least one electronic device mounted in the vehicle.

First Exemplary Embodiment

Figure 1:
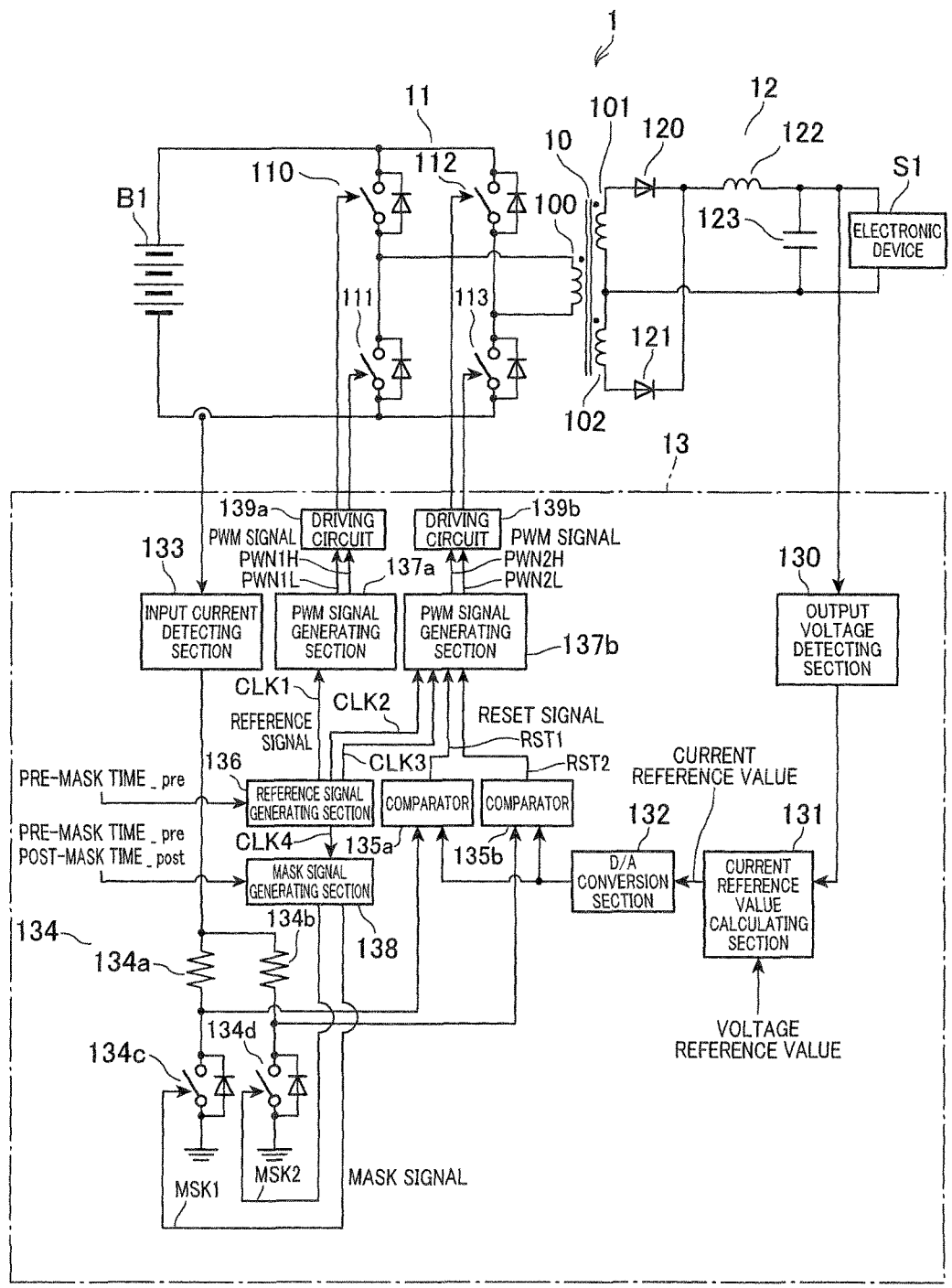
FIG. 1 is a circuit diagram showing a DC-DC converter acting as a power converter according to a first exemplary embodiment of the present invention.

First, a DC-DC converter according to a first exemplary embodiment is described below. With reference to FIG. 1, a configuration of the DC-DC converter is described. FIG. 1 is a circuit diagram of a DC-DC converter of the first exemplary embodiment.

A DC-DC converter (power converter) 1 shown in FIG. 1 is configured by a full-bridge converter that steps down a voltage outputted from a battery B1 in an isolated manner and supplies the step-down voltage to an electronic device S1 mounted in a vehicle. This DC-DC converter 1 includes a transformer 10, an input-side circuit (switch circuit) 11, an output-side circuit 12, and a control circuit 13.

The transformer 10 is an element that steps down an alternating current (AC) voltage inputted to the primary side in an isolated manner and outputs the stepped down voltage from the secondary side. The transformer 10 includes a primary winding 100 and secondary windings 101 and 102. A winding ratio of the primary winding 100 to the secondary windings 101 and 102 is set to n1:n2 (n1>n2). In the primary winding 100, one end and the other end are connected the input-side circuit 11, respectively. The secondary windings 101 and 102 are connected in series to each other. Specifically, one end of the secondary winding 101 is connected to one end of the secondary winding 102. The other end of the respective secondary windings 101, 102 and a series connection point of the secondary windings 101, 102 are connected to the input-side circuit 12, respectively.

The input-side circuit 11 is a circuit that is connected between the primary winding 100 and the battery B1, converts a DC voltage outputted from the battery B1 into an AC voltage and applies the converted AC voltage to the primary winding 100. This input-side circuit 11 includes four switches 110 to 113. These switches 110 to 113 are configured by an element that converts a DC voltage outputted from the battery B1 to an AC voltage by a switching operation and applies the converted AC voltage to the primary winding 100. The switches 110, 111 are connected in series to each other, and the switches 112, 113 are connected in series to each other. Specifically, one end of the switch 110 is connected to one end of the switch 111, and one end of the switch 112 is connected to one end of the switch 113. One set of the series-connected switches 110, 111 and the other set of the series-connected switches 112, 113 are connected in parallel to the battery B1. Specifically, the other end of the respective switches 110, 112 is connected to a positive electrode end of the battery B1, and the other end of the respective switches 111, 113 is connected to a negative electrode end of the battery B1. That is, these switches 110 to 113 form a full-bridge configuration. A control end of the respective switches 110 to 113 is connected to the control circuit 13.

The output-side circuit 12 is a circuit that is connected between the secondary windings 101, 102 and the electronic device S1, converts an AC voltage outputted from the secondary windings 101, 102 into a DC voltage and supplies the converted DC voltage to the electronic device S1. This output-side circuit 12 includes diodes 120 and 121, an inductor 122, and a capacitor 123.

The diodes 120 and 121 are an element that is connected to the secondary windings 101, 102, and rectifies an AC voltage outputted from the secondary windings 101, 102. The diode 120 has an anode and a cathode, in which the anode is connected to the other end of secondary winding 101, and the cathode connected to the inductor 122. The diode 121 has an anode and a cathode, in which the anode is connected to the other end of secondary winding 102, and the cathode connected to the inductor 122.

The inductor 122 and the capacitor 123 are elements that smooth a DC voltage converted by the diodes 120, 121. The inductor 122 has two ends, one of which is connected to a cathode of the respective diodes 120, 121, and the other end is connected to one end of the capacitor 123. The other end of the capacitor 123 is connected to a series connection point of the secondary windings 120, 121. One end of the capacitor 123 is also connected to a positive electrode end of the electronic device S1, and the other end thereof is also connected to a negative electrode end of the electronic device S1.

The control circuit 13 is a circuit that controls the input-side circuit 11 such that an output voltage of the output-side circuit 12 matches a predetermined voltage reference value. This control circuit 13 includes an output voltage detecting section 130, a current reference value calculating section 131, a digital to analog (D/A) converter section 132, an input current detecting section (configuring a part of a current detector or current detecting means) 133, a mask circuit (configuring a part of a current detector or current detecting means and a mask unit or mask means) 134, two comparators (configuring a reset signal generator or reset signal generating means) 135a, 135b, a reference signal generating section (configuring a reference signal generator or reference signal generating means) 136, two pulse-width modulation (PWM) signal generating sections (configuring a part of a driving unit or driving means) 137a, 137b, a mask signal generating section (configuring a part of current detector or current detecting means and a mask signal generator or mask signal generating means) 138, and two driving circuits (configuring a part of a driving unit or driving means) 139a, 139b.

The output voltage detecting section 130 is a block that detects an output voltage supplied to the electronic device S1 from the output-side circuit 12 and converts the detected voltage into a corresponding predetermined voltage. The output voltage detecting section 130 is connected to an output end of the output-side circuit 12. Specifically, the output voltage detecting section 130 is connected to one end of the capacitor 123, and is also connected to the current reference value calculating section 131.

The current reference value calculating section 131 is a block that converts an output voltage of the output-side circuit 12 into a digital value, determines a current reference value (current command) on the basis of: (i) the converted digital value of the output voltage; and (ii) a voltage reference value which is predetermined as a digital value, and outputs the determined current reference value as a digital value. Specifically, the current reference value calculating section 131 determines a current reference value by carrying out proportional integral calculation with respect to a deviation between an output voltage value and a voltage reference value, and outputs the determined current reference value as a digital value. The current reference value calculating section 131 is connected to the output voltage detecting section 130, and is also connected the D/A conversion section 132.

The D/A conversion section 132 is a block that converts the current reference value outputted from the current reference value calculating section 131 into a voltage and outputs the converted voltage. The D/A conversion section 132 is connected to the current reference value calculating section 131, and is also connected to the comparators 135a, 135b.

The input current detecting section 133 is a block that detects an input current of the input-side circuit 11 inputted from the battery B1, converts the detected current into a corresponding predetermined voltage, and outputs the converted voltage. The input current detecting section 133 is connected to a current sensor which is provided in an input-side of the input-side circuit 11 and more specifically is provided in a wiring for connecting the battery B1 and the switches 111, 113. The input current detecting section 133 is also connected to the mask circuit 134.

The mask circuit 134 is a circuit that forces an output voltage of the input current detecting section 133 to be set to 0 (zero) V on the basis of mask signals MSK1, MSK2 outputted from the mask signal generating section 138 as described below. The mask circuit 134 includes two resistors 134a, 134b and two switches 134c, 134d. One end of the respective resistors 134a, 134b is connected to the input current detecting section 133. The other end respective resistors 134a, 134b is connected to one end of the respective switches 134c, 134d. The other end of the respective switches 134c, 134d is electrically grounded. One connection point between the resistor 134a and the respective switches 134c is connected to the comparator 135a, and the other connection point between the respective resistors 134b and the respective switches 134d is connected to the comparator 135b. The respective switches 134c, 134d have a control end which is connected to the mask signal generating section 138.

The respective comparators 135a, 135b are elements that produce reset signals RST1, RST2 independently for each two diagonally arranged switches on the basis of an output voltage of the D/A conversion section 132 and an output voltage of the mask circuit 134 and outputs the produced reset signals RST1, RST2. The respective comparators 135a, 135b have two input ends. In the comparator 135a, one input end is connected to the D/A conversion section 132 and the other end is connected to a connection point between the resistor 134a and the switch 134c. In the comparator 135b, one input end is connected to the D/A conversion section 132 and the other end is connected to a connection point between the resistor 134b and the switch 134d. The respective comparators 135a, 135b have an out end which is connected to the PWM signal generating section 137b.

The reference signal generating section 136 is a block that generates reference signals CLK1 to CLK3 at each predetermined period, generates a reference signal CLK4 at each predetermined period on the basis of a predetermined pre-mask time (first predetermined time) T_pre, and outputs the generated reference signals CLK1 to CLK4. Here, the reference signal CLK1 is a signal for generating PWM signals PWM1H, PWM1L as described below, the reference signal CLK2 is a signal for generating a PWM signal PWM2H as described below, the reference signal CLK3 is a signal for generating a PWM signal PWM2L as described below, and the reference signal CLK4 is a signal for generating mask signals MSK1, MSK2 as described below. The pre-mask time T_pre is determined by delay times in the input current detecting section 133, the mask circuit 134, the comparators 135a, 135b, the PWM signal generating section 137b, the driving circuit 139b and the switches 110 to 113. This reference signal generating section 136 is connected to the PWM signal generating sections 137a, 137b and the mask signal generating section 138.

The PWM signal generating section 137a is a block that generates PWM signals PWM1H, PWM1L for switching the switches 110, 111 on and off on the basis of the reference signal CLK1 outputted from the reference signal generating section 136, and outputs the generated PWM signals PWM1H, PWM1L. This signal generating section 137a is connected to the reference signal generating section 136 and the driving circuit 139a.

The PWM signal generating section 137b is a block that generates PWM signal PWM2H, PWM2L for switching the switches 112, 113 on and off on the basis of the reference signals CLK2, CLK3 outputted from the reference signal generating section 136 and the reset signals RST1, RST2 outputted from the comparators 135a, 135b, and outputs the generated PWM signal PWM2H, PWM2L. This PWM signal generating section 137b is connected to the reference signal generating section 136, the comparators 135a, 135b and the driving circuit 139a.

The mask signal generating section 138 is a block that generates mask signals MSK1, MSK2 on the basis of the reference signal CLK4 outputted from the reference signal generating section 136, a predetermined pre-mask time (first predetermined time) T_pre and a predetermined post-mask time (second predetermined time) T_post, and outputs the generated mask signals MSK1, MSK2. Here, the post-mask time T_post is determined by delay times in the input current detecting section 133, the mask circuit 134, the comparators 135a, 135b, the PWM signal generating section 137b, the driving circuit 139b, and the switches 110 to 113. This mask signal generating section 138 is connected to the reference signal generating section 136 and a control end of the respective switches 134c, 134d of the mask circuit 134.

The respective driving circuits 139a, 139b is a circuit that switches the switches 110 to 113 on and off on the basis of the PWM signals PWM1H, PWM1L, PWM2H, PWM2L outputted from the PWM signal generating sections 137a, 137b. The respective driving circuits 139a, 139b is connected to the respective PWM signal generating sections 137a, 137b. The driving circuit 139a is connected to a control end of the respective switches 110, 111. The driving circuit 139b is connected to a control end of the respective switches 112, 113.

Figure 2:
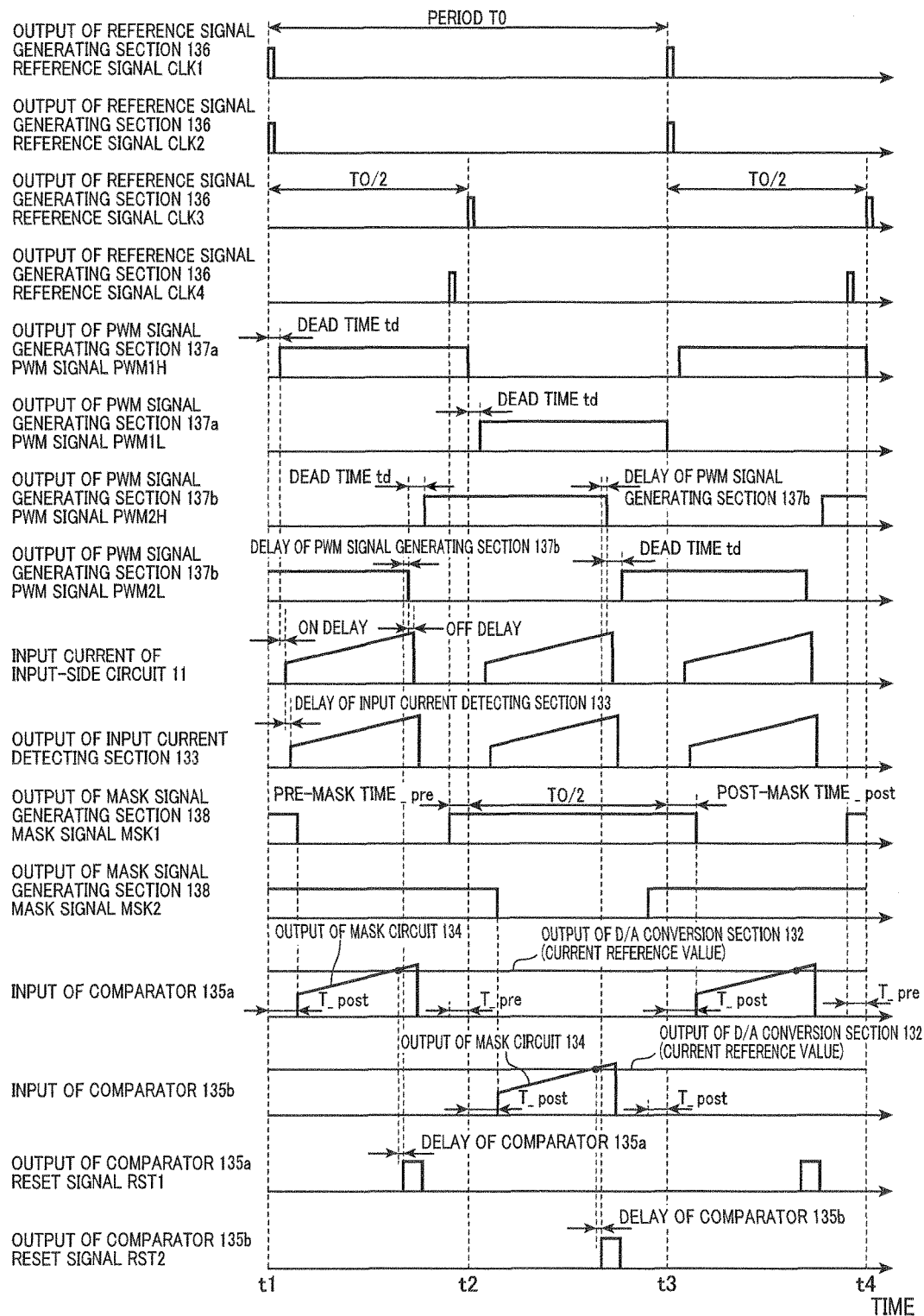
FIG. 2 is a timing chart showing operation of the DC-DC converter of FIG. 1.
Figure 3:
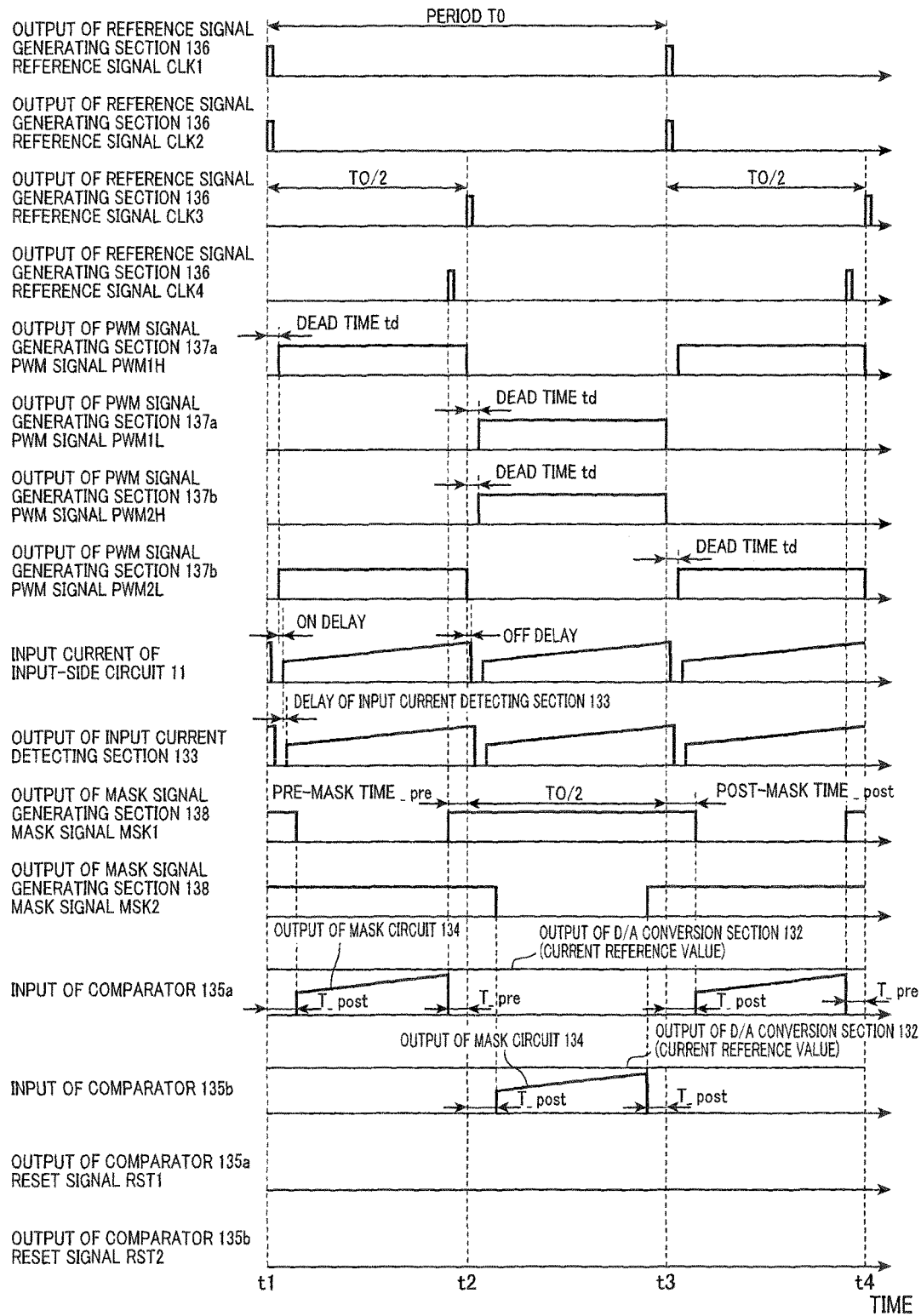
FIG. 3 is another timing chart showing operation of the DC-DC converter of FIG. 1.
Figure 4:
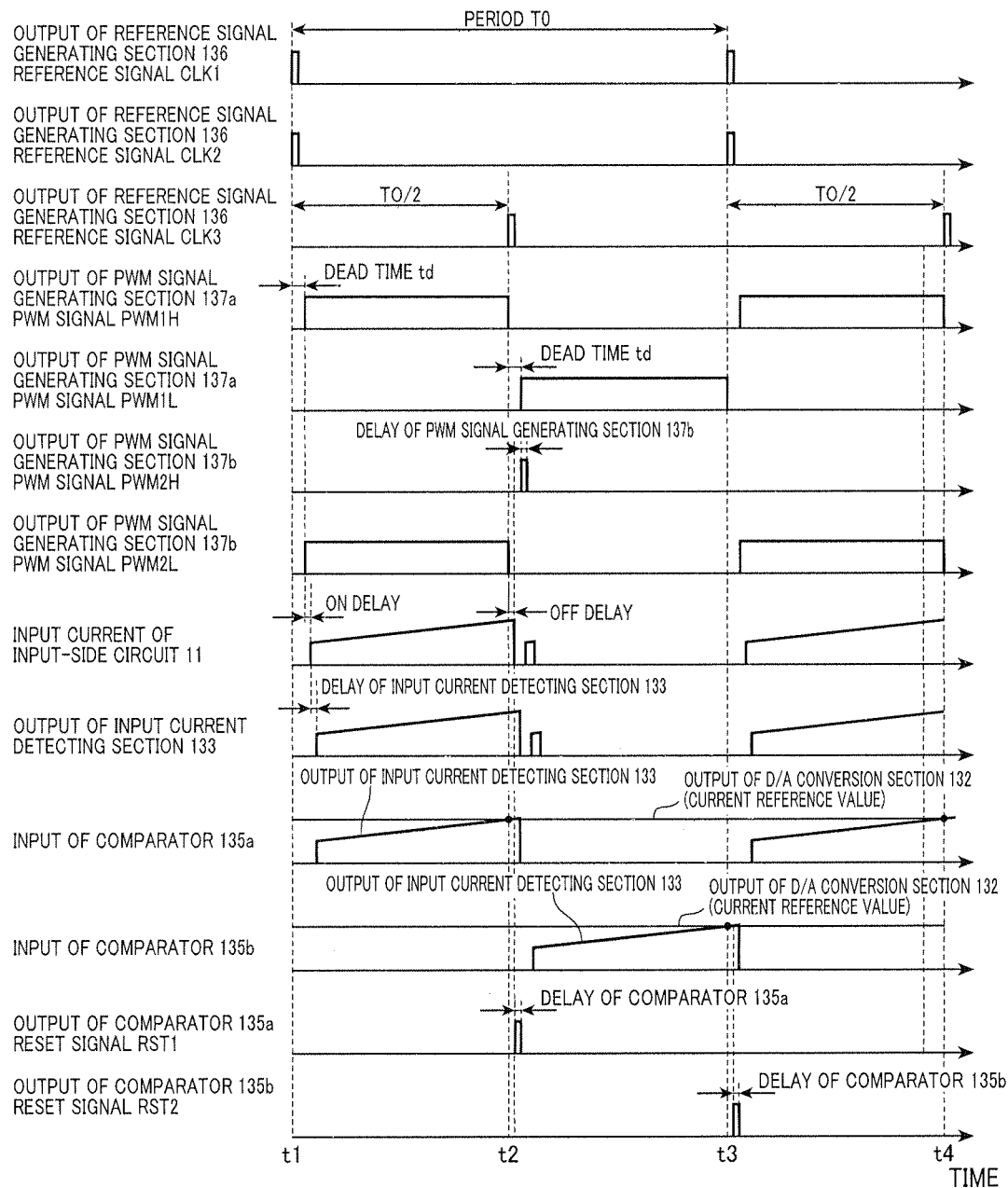
FIG. 4 is a timing chart showing operation of a DC-DC converter in related arts.

Next, with reference to FIGS. 1 to 4, operation of the DC-DC converter 1 is described below. FIG. 2 is a timing chart for explaining the operation of the DC-DC converter 1 in FIG. 1. FIG. 3 is another timing chart for explaining the operation of the DC-DC converter 1 in FIG. 1. FIG. 4 is a timing chart for explaining the operation of the DC-DC converter 1 in a conventional configuration.

The output voltage detecting section 130 shown in FIG. 1 detects an output voltage of the output-side circuit 12 which is supplied to the electronic device S1, converts the detected voltage into a corresponding predetermined voltage, and outputs the converted voltage.

The current reference value calculating section 131 converts an output voltage of the output voltage detecting section 130 into a digital value, determines a current reference value by carrying out proportional integral calculation with respect to a deviation between the converted digital value of the output voltage and a voltage reference value which is predetermined as a digital value, and outputs the determined current reference value as a digital value.

The D/A conversion section 132 converts the digital value of the current reference value outputted from the current reference value calculating section 131 into a voltage and outputs the converted voltage.

The reference signal generating section 136 shown in FIG. 1 generates pulse-like (high-level) reference signals CLK1 to CLK3 at each predetermined period, generates a reference signal CLK4 at each predetermined period on the basis of a predetermined pre-mask time T_pre, and outputs the generated reference signals CLK1 to CLK4. Specifically, as shown in FIG. 2, the pulse-like (high-level) reference signal CLK1 is generated and outputted at the start of each period T0. The pulse-like (high-level) reference signal CLK2 is generated and outputted at the start of each period T0 and at the same timing as an output timing of the reference signal CLK1. The pulse-like (high-level) reference signal CLK3 is generated and outputted with a period T0 and at a timing in which a phase of the reference signal CLK3 is shifted by T0/2 (one-half of the period T0) with respect to an output timing of the reference signal CLK2. The pulse-like (high-level) reference signal CLK4 is generated and outputted with a period T0 and at a timing which is a predetermined pre-mask time T_pre earlier than an output timing of the reference signal CLK3.

The mask signal generating section 138 shown in FIG. 1 generates mask signals MSK1, MSK2 on the basis of the reference signal CLK4 outputted from the reference signal generating section 136, a predetermined pre-mask time T_pre and a predetermined post-mask time T_post, and outputs the generated mask signals MSK1, MSK2. Specifically, as shown in FIG. 2, the mask signal MSK1 is generated and outputted so as to become high level at a rising timing of the reference signal CLK4 and becomes low level after a period obtained as a sum of the predetermined pre-mask time T_pre, T0/2 and the predetermined post-mask time T_post (T_pre+T0/2+T_post) has elapsed. The mask signal MSK2 is generated and outputted such that a phase of mask signal MSK2 is shifted by T0/2 with respect to a phase of the mask signal MSK1.

The input voltage detecting section 133 shown in FIG. 1 detects an input current of the input-side circuit 11 inputted from the battery B1, converts the detected current into a corresponding predetermined voltage, and outputs the converted voltage.

The mask circuit 134 forces an output voltage of the input current detecting section 133 to be set to 0 V on the basis of mask signals MSK1, MSK2 outputted from the mask signal generating section 138. Specifically, as shown in FIG. 2, while the mask signal MSK1 is high level, the switch 134c is turned on, and then, an output voltage of the input current detecting section 133 is forced to be set to 0 V and is outputted to the comparator 135a. While the mask signal MSK2 is high level, the switch 134d is turned on, and then, an output voltage of the input current detecting section 133 is forced to be set to 0 V and is outputted to the comparator 135b. As a result, the output voltage of the input current detecting section 133 is forced to be set to 0 V during: (i) a period of the pre-mask time T_pre before a rising timing of the respective reference signals CLK2, CLK3; and (ii) a period of the post-mask time T_post after a rising timing of the respective reference signals CLK2, CLK3.

The comparator 135a shown in FIG. 1 produces a reset signal RST1 on the basis of an output voltage of the D/A conversion section 132 and an output voltage of the mask circuit 134, and outputs the produced reset signal RST1. Specifically, as shown in FIG. 2, the reset signal RST1 is produced and outputted so as to become high level when an output voltage of the mask circuit 134 is larger than an output voltage of the D/A conversion section 132.

The comparator 135b produces a reset signal RST2 on the basis of an output voltage of the D/A conversion section 132 and an output voltage of the mask circuit 134, and outputs the produced reset signal RST2. Specifically, as shown in FIG. 2, the reset signal RST2 is produced and outputted so as to become high level when an output voltage of the mask circuit 134 is larger than an output voltage of the D/A conversion section 132.

The PWM signal generating section 137a shown in FIG. 1 generates PWM signals PWM1H, PWM1L for switching the switches 110 and 111 on and off on the basis of the reference signal CLK1 outputted from the reference signal generating section 136, and outputs the generated PWM signals PWM1H, PWM1L.

Specifically, as shown in FIG. 2, the PWM signal PWM1H is generated and outputted so as to: (i) be synchronized with time t1 which is a rising timing of the reference signal CLK1; (ii) become high level after a dead time td has elapsed from time t1; and (iii) become low level in synchronization with time t2 after T0/2 has elapsed from time t1.

The PWM signal PWM1L is generated and outputted so as to: (i) be synchronized with time t2; (ii) become high level after a dead time td has elapsed from time t2; and (iii) become low level in synchronization with time t3 that is a rising timing of the next reference signal CLK1.

After that, in the same way, the PWM signals PWM1H, PWM1L are generated and outputted.

The PWM signal generating section 137b shown in FIG. 1 generates PWM signal PWM2H, PWM2L for switching the switches 112 and 113 on and off on the basis of the reference signals CLK2, CLK3 outputted from the reference signal generating section 136 and the reset signals RST1, RST 2 outputted from the comparators 135a, 135b, and outputs the generated PWM signal PWM2H, PWM2L.

Specifically, as shown in FIG. 2, the PWM signal PWM2H is generated and outputted so as to: (i) when the reset signal RST1 is outputted before time t2, become high level after a dead time td has elapsed from a falling timing of the PWM signal PWM2L being low level in synchronization with a rising timing of the reset signal RST1, when the reset signal RST1 is outputted before time t2; (ii) when the reset signal RST1 is not outputted before time t2, become high level after a dead time td has elapsed from time t2; (iii) when the reset signal RST2 is outputted before time t3, become low level in synchronization with a rising timing of the reset signal RST2; and (iv) when the reset signal RST2 is not outputted before time t3, become low level in synchronization with time t3.

The PWM signal PWM2L is generated and outputted so as to become high level so as to: (i) when the reset signal RST2 is outputted before time t3, become high level after a dead time td has elapsed from a falling timing of the PWM signal PWM2H being low level in synchronization with time t3; (ii) when the reset signal RST2 is not outputted before time t3, become high level after a dead time td has elapsed from time t3; (iii) when the reset signal RST 1 is outputted before time t4 which is after T0/2 has elapsed from time t3, become low level in synchronization with a rising timing of the reset signal RST1; and (iv) when the reset signal RST 1 is not outputted before time t4, become low level in synchronization with time t4.

After that, in the same way, the PWM signals PWM2H, PWM2L are generated and outputted.

The driving circuit 139a shown in FIG. 1 switches the switches 110, 111 on and off on the basis of the PWM signals PWM1H, PWM1L outputted from the PWM signal generating section 137a. Specifically, the switch 110 is turned on when the PWM signal PWM1H is high level, and the switch 111 is turned on when the PWM signal PWM1L is high level.

The driving circuit 139b shown in FIG. 1 switches the switches 112, 113 on and off on the basis of the PWM signals PWM2H, PWM2L outputted from the PWM signal generating section 137b. Specifically, the switch 112 is turned on when the PWM signal PWM2H is high level, and the switch 113 is turned on when the PWM signal PWM2L is high level.

Thus, in the input-side circuit 11, with respect to on-period of one of two diagonally arranged switches, a phase of on-period of the other of two diagonally arranged switches is regulated (shifted) such that on-period of two diagonally arranged switches are controlled. This control method is also called a phase shift control method.

Thus, a DC voltage of the battery B1 is converted into an AC voltage, and then, the converted AC voltage is applied to the primary winding 100 of the transformer 10. Upon application of the AC voltage to the primary winding 100, a stepped down AC voltage is outputted from the secondary windings 101, 102 of the transformer 10. In the output-side circuit 12, the AC voltage outputted from the secondary windings 101, 102 is converted into a DC voltage and is supplied to the electronic device S1.

FIG. 2 shows the timing chart in a case where a timing for an input current of the input-side circuit 11 to reach a current reference value is much earlier than rising timing of the reference signals CLK2, CLK3. In this case, even when a delay of the input current detecting section 133, an on-delay, or an off-delay occurs, an input current flowing prior to these rising timing cannot be outputted from the input current detecting section 133 after these rising timing.

FIG. 3 shows the timing chart in a case where a timing for an input current of the input-side circuit 11 to reach a current reference value is close to rising timing of the reference signals CLK2, CLK3. In this case, an input current flowing prior to these rising timing may be outputted from the input current detecting section 133 after these rising timing.

By comparison, FIG. 4 shows a timing chart in related art where the mask circuit 134 and the mask signal generating section 138 are not provided and an output voltage of the input current detecting section 133 is directly inputted to the comparators 134a, 135b. In this related art, a reset signal is generated and outputted immediately after time t2. In other words, a reset signal RST1 needed to be outputted immediately before time t2 may be outputted immediately after time t2 due to a delay of the input current detecting section 133, an on-delay, or an off-delay. As a result, the switch 112 is turned on in synchronization with the reference signal CLK3 outputted at a timing of time t2, but may be turned off in synchronization with the reset signal RST1 outputted immediately after an output of reference signal CLK3 due to a delay of the input current detecting section 133, an on-delay or an off-delay. This switching operation is different from the desired switching operation. Due to this, a current, which needs to normally flow, does not flow. Thus, an input current or an output voltage is greatly changed. The same is equally true of a case where a case where a delay of the comparators 135a, 135b occurs.

In the PWM signal generating section 137b and the driving circuit 139b, there is a delay between a time point when the reset signal RST2 is outputted and a time point when the switch is turned off. There is also a delay in the switch 112. Due to this, even when the reset signal is outputted immediately before time t2, the switch, which is turned on in synchronization with the reference signal outputted at a timing of time t2, may be turned off immediately after the reference signal is outputted due to a delay of the driving circuit 139b and a delay of the switch 112. This switching operation is also different from the desired switching operation. Thus, a current, which needs to normally flow, does not flow.

However, as shown in FIG. 1, the DC-DC converter 1 includes the mask circuit 134 and the mask signal generating circuit 138. As shown in FIG. 3, the mask signal generating circuit 138 generates the mask signals MSK1, MSK2 and outputs the generated mask signals MSK1, MSK2. The mask signal MSK1 is generated and outputted so as to; (i) become high level at a rising timing of the reference signal CLK4; and (ii) become low level after a period obtained as a sum of the predetermined pre-mask time T_pre, T0/2 and the predetermined post-mask time T_post (T_pre+T0/2+T_post) has elapsed. The mask signal MSK2 is generated and outputted such that a phase of mask signal MSK2 is shifted by T0/2 with respect to a phase of the mask signal MSK1.

As shown in FIG. 3, while the mask signals MSK1, MSK2 are high level, the mask circuit 134 shown in FIG. 1 forces an output voltage of the input current detecting section 133 to be set to 0 V. As a result, the output voltage of the input current detecting section 133 is forced to be set to 0 V during: (i) a period of the pre-mask time T_pre before a rising timing of the respective reference signals CLK2, CLK3; and (ii) a period of the post-mask time T_post after a rising timing of the respective reference signals CLK2, CLK3. This enables the comparators 135a, 135b to set the reset signals RST1, RST2 to low level during these periods. This makes it possible for the PWM signal generating section 137b and the driving circuit 139b not to turn the switches 112, 113 off in synchronization with the reset signals RST1, RST2 during these periods. This can prevent a switching operation which is different from the desired switching operation as shown in FIG. 4 and which is caused by delays of the input current detecting section 133, the comparators 135a, 135b, the PWM signal generating section 137b, the driving circuit 139b, and the switches. Thus, even when these delays occur, a fluctuation of, e.g., an input current can be suppressed.

Next, effects of the first exemplary embodiment are described below.

A delay occurs in the input current detecting section, the comparators, the PWM signal generating sections, and the switches. If there is no mask process based on the post-mask time T_post, the input current may be detected and then the reset signals may be outputted also after the reference signals due to these delays, even when the reset signals are outputted from the comparators before the reference signals. If there is no mask process based on the pre-mask time T_pre, the reset signals may be outputted after the reference signals due to these delays, even when the detected input current reaches the current reference value at a timing before the reference signals. Alternatively, a logic level inversion of the PWM signal outputted from the PWM signal generating section may be performed after the reference signals, even when the reset signals are outputted before the reference signals.

As a result, when subsequently the switch is turned on, it may not be properly turned on. In this case, switching on and off of the switch cannot be controlled with the appropriate duty cycle. Thus, an output voltage which is a controlled variable may be fluctuated, thereby affecting voltage supply to the electronic device. Due to this, the electronic device may be stopped or damaged. In addition, the DC-DC converter itself cannot be properly controlled on the basis of the current reference value, thereby inducing, e.g., bias magnetism of the transformer. Thus, breakdown of elements may be caused due to overcurrent in the DC-DC converter.

However, according to the first exemplary embodiment, the PWM signal generating section 137*b* and the driving circuit 139*b* turns the switches 112, 113 off in synchronization with the reset signals RST1, RST2 during (i) a period of the pre-mask time T_pre before a rising timing of the respective reference signals CLK2, CLK3, and (ii) a period of the post-mask time T_post after a rising timing of the respective reference signals CLK2, CLK3, i.e., a period (predetermined time) including the pre-mask time T_pre and the post-mask time T_post (T_pre+T_post) before and after an output timing of the reference signals CLK2, CLK3.

As a result, even when the reset signal, which needs to be outputted immediately before the reference signal, is outputted immediately after the reference signal is outputted due to a delay of the input current detecting section 133 and a delay of the comparators 135*a*, 135*b*, the switches 112, 113 can be controlled so as not to be turned off in synchronization with the reset signal outputted immediately after the reference signal is outputted.

In addition, even when the reset signal is outputted immediately before the reference signal is outputted, the switches 112, 113 can be controlled so as not to be turned off immediately after the reference signal is outputted due to a delay of the PWM signal generating section 137*b*, a delay of the driving circuit 139*b*, and a delay of the switches 112, 113. This can prevent an occurrence of a switching operation which is different from the desired switching operation and is caused by these delays, thereby making it possible to suppress a fluctuation of, e,g., the input current due to these delays in the DC-DC converter 1 mounted in the vehicle. As a result, the input current can be controlled on the basis of the current reference value. This can prevent breakdown of elements due to overcurrent in the DC-DC converter 1. In addition, the output voltage can be stably controlled, and then, a voltage supply to the electronic device S1 can be reliably performed.

In addition, according to the first exemplary embodiment, the mask circuit 134 forces an output voltage of the input current detecting section 133 to be set to 0 V during: (i) a period of the pre-mask time T_pre before a rising timing of the respective reference signals CLK2, CLK3; and (ii) a period of the post-mask time T_post after a rising timing of the respective reference signals CLK2, CLK3. Thus, the reset signals RST1, RST2 can be set to low level during a period (predetermined time) including the pre-mask time T_pre and the post-mask time T_post (T_pre+T_post) before and after an output timing of the reference signals CLK2, CLK3. This can reliably prevent the switches 112, 113 from being turned off in synchronization with the reset signals RST1, RST2 during a period (predetermined time) including the pre-mask time T_pre and the post-mask time T_post (T_pre+T_post) before and after an output timing of the reference signals CLK2, CLK3.

According to the first exemplary embodiment, the mask signal generating section 138 generates mask signals MSK1, MSK2 on the basis of a predetermined pre-mask time T_pre and a predetermined post-mask time T_post, and outputs the generated mask signals MSK1, MSK2. Based on the mask signals MSK1, MSK2, the mask circuit 134 forces an output voltage of the input current detecting section 133 to be set to 0 V. Thus, the output voltage of the input current detecting section 133 can be forced to be set to 0 V during a period (predetermined time) including the pre-mask time T_pre and the post-mask time T_post (T_pre+T_post) before and after an output timing of the reference signals CLK2, CLK3.

According to the first exemplary embodiment, the pre-mask time Tare and the post-mask time T_post are determined based on a delay time of each of the input current detecting section 133, the mask circuit 134, the comparators 135, 135*b*, the PWM signal generating section 137*b*, the driving circuit 139*b*, the switches 110 to 113. This can prevent an occurrence of a switching operation which is different from the desired switching operation and is caused by a delay of, e.g., the input current detecting section 133.

According to the first exemplary embodiment, the input-side circuit 11 is configured by a full-bridge connection of four switches 110 to 113. This can suppress a fluctuation of, e.g., the input current due to a delay of e.g., the input current detecting section 133 in the DC-DC converter 1 provided with the input-side circuit 11 configured by the full-bridge connection of these switches 110 to 113.

According to the first exemplary embodiment, in the input-side circuit 11, the switches 110, 111 are located at one arm side, and the switches 112, 113 are located at the other arm side. The switch 110 on one arm side is diagonally arranged with respect to the switch 113 on the other side, and the switch 111 on one arm side is diagonally arranged with respect to the switch 112 on the other side. With respect to an on-period of the respective switch 110, 111 on one arm side, a phase of an on-period of the respective switches 112, 113 on the other arm side (i.e., diagonally arranged with respect to the switch 110, 111) is regulated (shifted). Thus, the on-period of the respective diagonally arranged switches is controlled by using the phase shift control method. This can suppress a fluctuation of, e.g., the input current due to a delay of, e.g., the input current detecting section 133 in the DC-DC converter 1 using the phase shift control method.

According to the first exemplary embodiment, there is provided with two comparators 135*a*, 135*b* that individually generates the reset signals RST1, RST2 every two switches diagonally arranged and outputs them. This can, for example, suppress a fluctuation of the input current due to a delay of the input current detecting section 133 in the DC-DC converter 1.

In the first exemplary embodiment, the reference signal CLK2 becomes high level at the same timing as an output timing of the reference signal CLK1, and the reference signal CLK3 becomes high level at a timing whose phase is shifted by T0/2 with respect to an output timing of the reference signal CLK2. The present disclosure is not limited to this.

Figure 5:
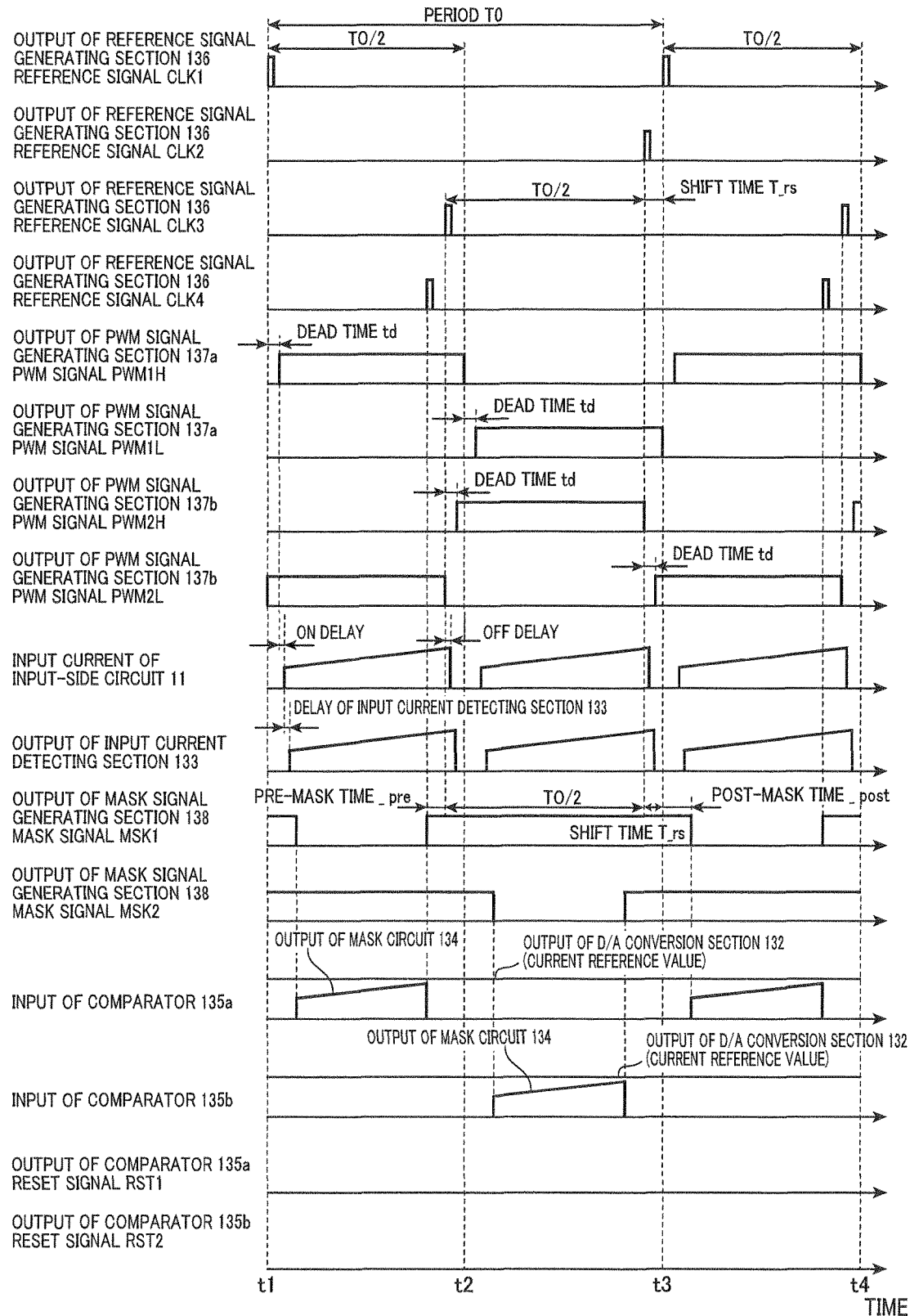
FIG. 5 is a timing chart showing operation of a DC-DC converter according to a modification of the first exemplary embodiment.

For example, as shown in FIG. 5, the reference signal CLK2 may become high level at a timing whose phase is shifted by a predetermined shift time T_rs with respect to an output timing of the reference signal CLK1. In this case, the mask signal generating section 138 may generate a mask signal MSK1 which becomes high level at a rising timing of the reference signal CLK4 and becomes low level after a period obtained as a sum of the pre-mask time T_pre, T0/2, and the post-mask time T_post (T_pre+T0/2+T_post) has elapsed, and output the generated mask signal MSK1. In addition, the mask signal generating section 138 may generate a mask signal MSK2 whose phase is shifted by T0/2 with respect to the mask signal MSK1, and output the generated mask signal MSK2. Thus, in the same manner as the first exemplary embodiment, the output voltage of the input current detecting section 133 can be forced to be set to 0 V during a period (predetermined time) including the pre-mask time T_pre and the post-mask time T_post (T_pre+T_post) before and after an output timing of the reference signals CLK2, CLK3.

Second Exemplary Embodiment

Next, a DC-DC converter according to a second exemplary embodiment is described below. This DC-DC converter forces an output voltage of a comparator to be set to 0 V, in comparison to that of the first exemplary embodiment which forces the output voltage of the input current detecting section 133 to be set to 0 V during the pre-mask time T_pre and the post-mask time T_post (T_pre+T_post). This DC-DC converter of the second exemplary embodiment has the same configuration as the DC-DC converter of the first exemplary embodiment except for the comparator and its peripheral configuration.

Figure 6:
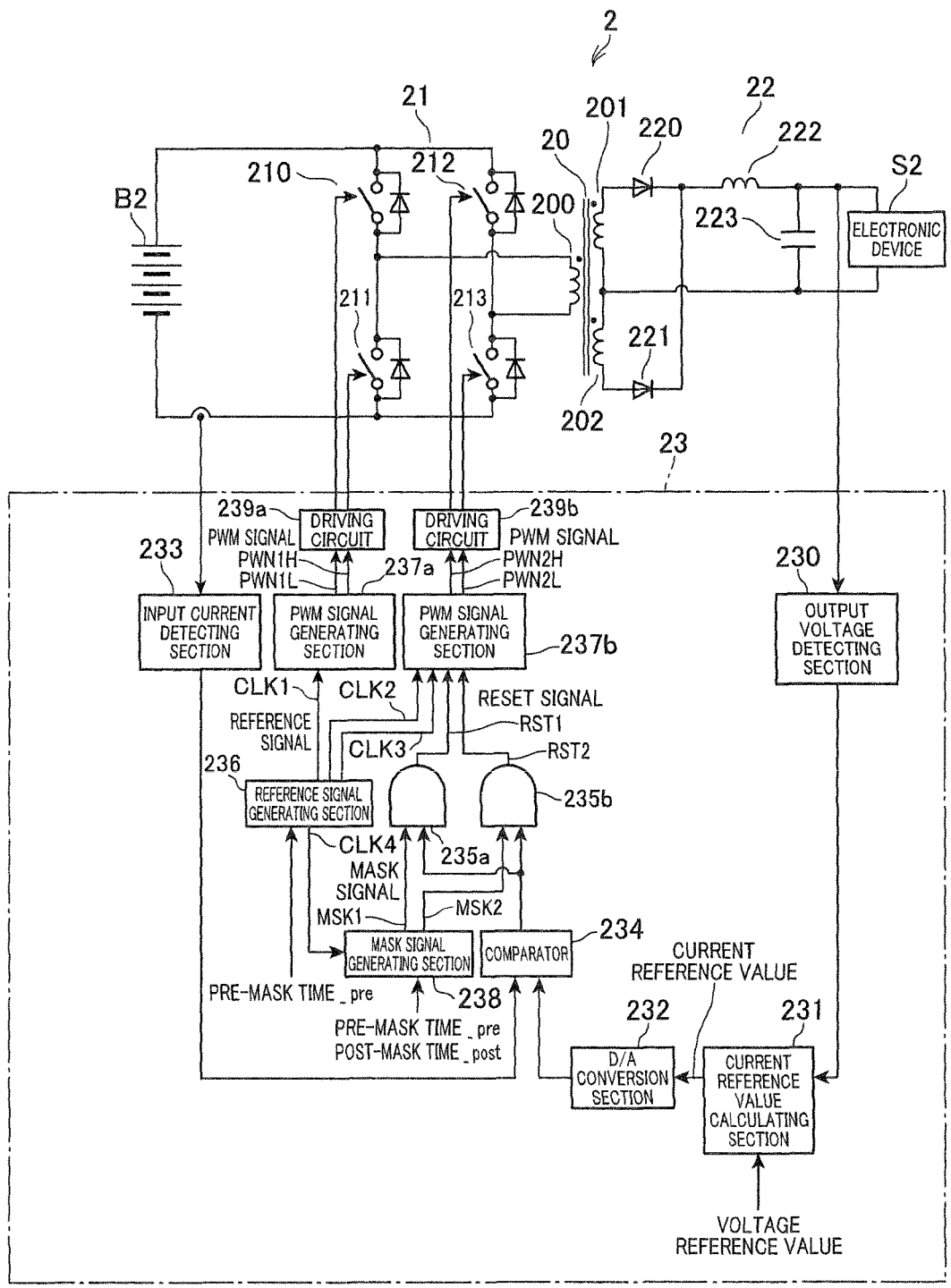
FIG. 6 is a circuit diagram showing a DC-DC converter acting as a power converter according to a second exemplary embodiment of the present invention.

With reference to FIG. 6, a configuration of the DC-DC converter of the second exemplary embodiment is described below. FIG. 6 is a circuit diagram of the DC-DC converter of the second exemplary embodiment.

A DC-DC converter (power converter) 2 shown in FIG. 6 is configured by a full-bridge converter that steps down a voltage outputted from a battery B2 in an isolated manner and supplies the stepped down voltage to an electronic device S2 mounted in a vehicle. This DC-DC converter 2 includes a transformer 20, an input-side circuit (switch circuit) 21, an output-side circuit 22, and a control circuit 23.

The transformer 20 includes a primary winding 200 and secondary windings 201, 202. This transformer 20 has the same configuration as the transformer 10 of the first exemplary embodiment. The input-side circuit 21 includes switches 210 to 213. This input-side circuit 21 has the same configuration as the input-side circuit 11 of the first exemplary embodiment. The output-side circuit 22 includes diodes 220, 221, an inductor 222, and a capacitor 223. This output-side circuit 22 has the same configuration as the output-side circuit 12 of the first exemplary embodiment.

The control circuit 23 includes an output voltage detecting section 230, a current reference value calculating section 231, a D/A conversion section 232, an input current detecting section (configuring a part of a current detector or current detecting means) 233, a comparator (configuring a part of a reset signal generator or reset signal generating means) 234, two mask circuits (configuring a part of a reset signal generator or reset signal generating means and a mask unit or mask means) 235a, 235b, a reference signal generating section (configuring a reference signal generator or reference signal generating means) 236, two PWM signal generating sections (configuring a part of a driving unit or driving means) 237a, 237b, a mask signal generating section (configuring a part of a reset signal generator or reset signal generating means and a mask signal generator or mask signal generating means) 238, and two driving circuits (configuring a part of a driving unit or driving means) 239a, 239b.

The output voltage detecting section 230, the current reference value calculating section 231, the D/A conversion section 232, and the input current detecting section 233 have the same configuration as the output voltage detecting section 130, the current reference value calculating section 131, the D/A conversion section 132, and the input current detecting section 133 of the first exemplary embodiment.

The comparator 234 is an element that compares an output voltage of the D/A conversion section 232 with an output voltage of the input current detecting section 233, produces an output voltage depending on its comparison result, and outputs the produced output voltage. The comparator 234 has two input ends and an output end. One of the input ends is connected to the D/A conversion section 232, and the other of the input ends is connected to the input current detecting section 233. The output end is connected to the mask circuits 235a, 235b.

The mask circuits 235a, 235b are a circuit that forces an output voltage of the comparator 234 to be set to 0 V on the basis of mask signals MSK1, MSK2 outputted from the mask signal generating section 238, and outputs this as reset signals RST1, RST2. Specifically, the mask circuits 235a, 235b are configured by an AND circuit. The mask circuits 235a, 235b have two input ends and an output end. One of the input ends is connected to the comparator 234. The other of the input ends is connected to the mask signal generating section 238. The output end is connected to the PWM signal generating sections 237b.

The reference signal generating section 236, the PWM signal generating sections 237a, 237b, the mask signal generating sections 238, and the driving circuits 239a, 239b have the same configuration as the reference signal generating section 136, the PWM signal generating sections 137a, 137b, the mask signal generating sections 138, and the driving circuits 139a, 139b of the first exemplary embodiment.

Figure 7:
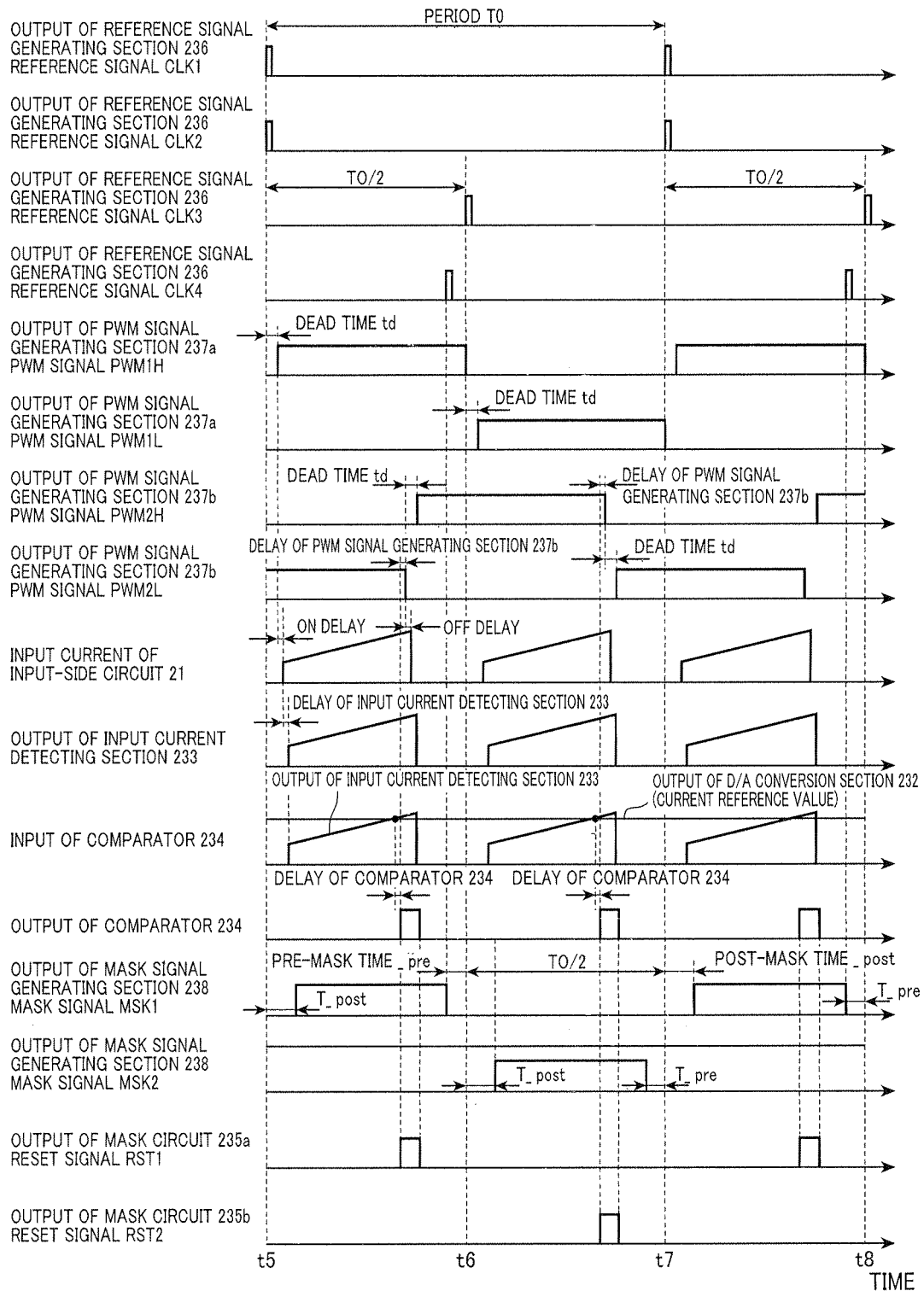
FIG. 7 is a timing chart showing operation of the DC-DC converter of FIG. 6.
Figure 8:
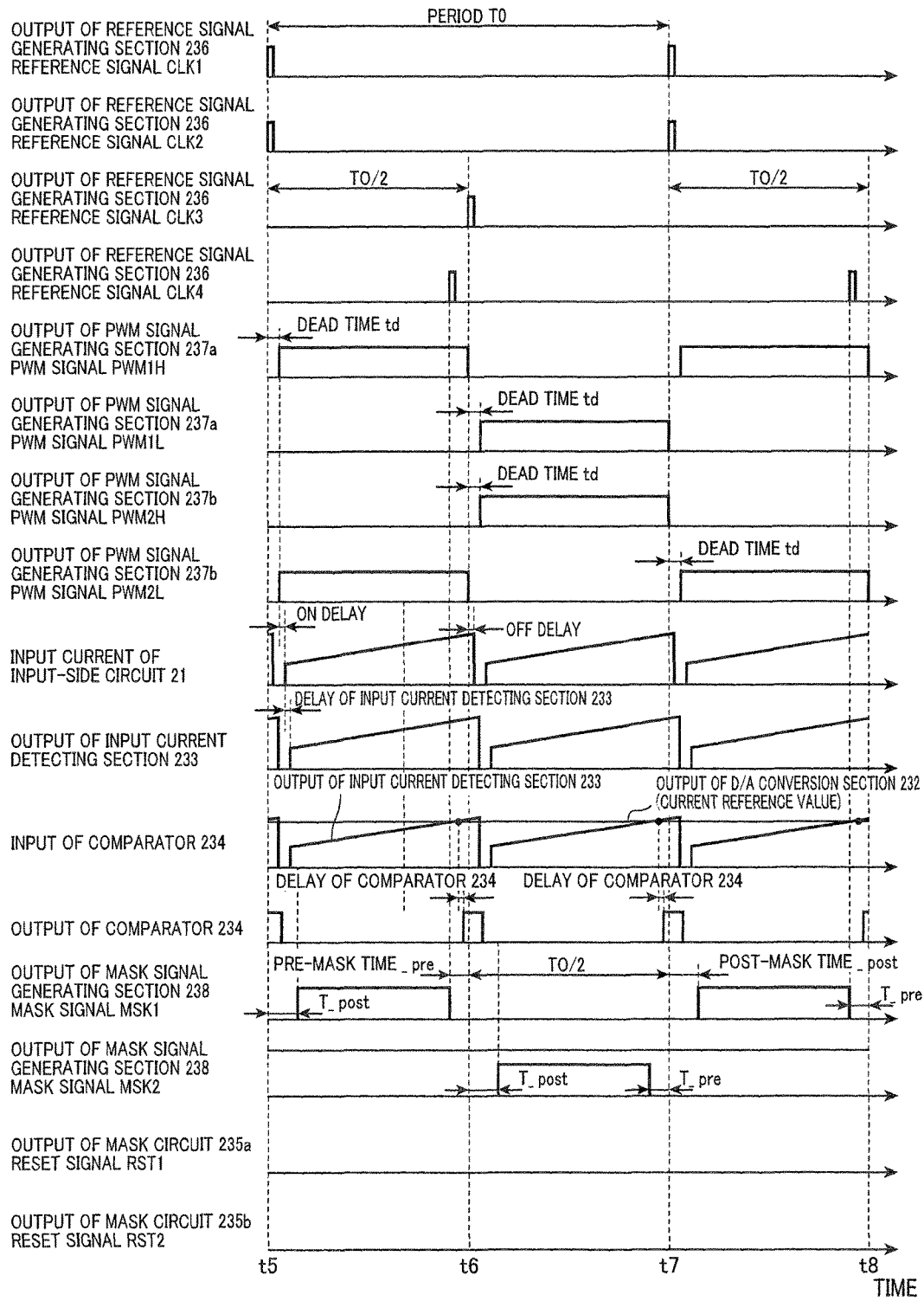
FIG. 8 is another timing chart showing operation of the DC-DC converter of FIG. 6.

Next, with reference to FIGS. 6 to 8, operation of the DC-DC converter 2 is described below. FIG. 7 is a timing chart for explaining the operation of the DC-DC converter 2 in FIG. 6. FIG. 8 is another timing chart for explaining the operation of the DC-DC converter 2 in FIG. 6.

The output voltage detecting section 230 shown in FIG. 6 detects an output voltage of the output-side circuit 22 which is supplied to the electronic device S2, converts the detected voltage into a corresponding predetermined voltage, and outputs the converted voltage.

The current reference value calculating section 231 converts an output voltage of the output voltage detecting section 230 into a digital value, determines a current reference value by carrying out proportional integral calculation with respect to a deviation between the converted digital value of the output voltage and a voltage reference value which is predetermined as a digital value, and outputs the determined current reference value as a digital value.

The D/A conversion section 232 converts the digital value of the current reference value outputted from the current reference value calculating section 231 into a voltage and outputs the converted voltage.

As shown in FIG. 7, the reference signal generating section 236 shown in FIG. 6 generates reference signals CLK1 to CLK4 which are the same as that generated by the reference signal generating section 136 of the first exemplary embodiment, and output the generated reference signals CLK1 to CLK4.

The mask signal generating section 238 shown in FIG. 6 generates mask signals MSK1, MSK2 on the basis of the reference signal CLK4 outputted from the reference signal generating section 236, a predetermined pre-mask time (first predetermined time) T_pre and a predetermined post-mask time (second predetermined time) T_post, and outputs the generated mask signals MSK1, MSK2. Specifically, as shown in FIG. 7, the mask signal MSK1 is generated and outputted so as to become low level at a rising timing of the reference signal CLK4 and becomes high level after a period obtained as a sum of the predetermined pre-mask time T_pre, T0/2 (one-half of the period T0) and the predetermined post-mask time T_post (T_pre+T0/2+T_post) has elapsed. The mask signal MSK2 is generated and outputted such that a phase of the mask signal MSK2 is shifted by T0/2 with respect to a phase of the mask signal MSK1.

The input voltage detecting section 233 shown in FIG. 6 detects an input current of the input-side circuit 21 inputted from the battery B2, converts the detected current into a corresponding predetermined voltage, and outputs the converted voltage.

The comparator 234 compares an output voltage of the D/A conversion section 232 with an output voltage of the input current detecting section 233. The comparator 234 has two input ends and an output end, produces an output voltage depending on its comparison result, and outputs the produced output voltage. Specifically, the output voltage becomes high level, when the input current detecting section 233 is larger than the output voltage of the D/A conversion section 232.

The mask circuits 235*a*, 235*b* force the output voltage of the input current detecting section 234 to be set to 0 V on the basis of mask signals MSK1, MSK2 outputted from the mask signal generating section 238. Specifically, as shown in FIG. 7, while the mask signal MSK1 is low level, the output voltage of the input current detecting section 234 is forced to be set to 0 V, and is outputted as a reset signal RST1. While the mask signal MSK2 is low level, the output voltage of the input current detecting section 234 is forced to be set to 0 V, and is outputted as a reset signal RST2. As a result, the reset signals RST1, RST2 are forced to be set to 0 V during (i) a period of the pre-mask time T_pre before a rising timing of the respective reference signals CLK2, CLK3 and (ii) a period of the post-mask time T_post after a rising timing of the respective reference signals CLK2, CLK3.

As shown in FIG. 7, the PWM signal generating section 237*a* shown in FIG. 6 generates PWM signals PWM1H, PWM1L and outputs the generated PWM signals PWM1H, PWM1L. Here, the PWM signal PWM1H is generated and outputted so as to: (i) be synchronized with time t5 which is a rising timing of the reference signal CLK1; (ii) become high level after a dead time td has elapsed from time t5; and (iii) become low level in synchronization with time t6 after T0/2 has elapsed from time t5. The PWM signal PWM1L is generated and outputted so as to: (i) be synchronized with time t6; (ii) become high level after a dead time td has elapsed from time t6; and (iii) become low level in synchronization with time t7 which is a rising timing of the next reference signal CLK1. After that, in the same way, the PWM signals PWM1H, PWM1L are generated and outputted.

As shown in FIG. 7, the PWM signal generating section 237*b* shown in FIG. 6 generates PWM signals PWM2H, PWM2L and outputs the generated PWM signals PWM2H, PWM2L.

Here, the PWM signal PWM2H is generated and outputted so as to: (i) when the reset signal RST1 is outputted before time t6, become high level after a dead time td has elapsed from a falling timing of the PWM signal PWM2L which becomes low level in synchronization with a rising timing of the reset signal RST1; (ii) when the reset signal RST1 is not outputted before time t6, become high level after a dead time td has elapsed from time t6; (iii) when the reset signal RST2 is outputted before time t7, become low level in synchronization with a rising timing of the reset signal RST2; and (iv) when the reset signal RST2 is not outputted before time t7, become low level in synchronization with time t7.

The PWM signal PWM2L is generated and outputted so as to: (i) when the reset signal RST2 is outputted before time t7, become high level after a dead time td has elapsed from a falling timing of the PWM signal PWM2H which becomes low level in synchronization with a rising timing of the reset signal RST2; (ii) when the reset signal RST2 is not outputted before time t7, become high level after a dead time td has elapsed from time t7; (iii) when the reset signal RST1 is outputted before time t8 after T0/2 has elapsed from time t7, become low level in synchronization with a rising timing of the reset signal RST1; and (iv) when the reset signal RST2 is not outputted before time t8, become low level in synchronization with time t8.

After that, in the same way, the PWM signals PWM2H, PWM2L are generated and outputted.

The driving circuit 239*a* shown in FIG. 6 switches the switches 210, 211 on and off on the basis of the PWM signals PWM1H, PWM1L outputted from the PWM signal generating section 237*a*. Specifically, the switch 210 is turned on when the PWM signal PWM1H is high level, and the switch 211 is turned on when the PWM signal PWM1L is high level.

The driving circuit 239*b* shown in FIG. 6 switches the switches 212, 213 on and off on the basis of the PWM signals PWM2H, PWM2L outputted from the PWM signal generating section 237*b*. Specifically, the switch 212 is turned on when the PWM signal PWM2H is high level, and the switch 213 is turned on when the PWM signal PWM2L is high level.

Thus, a DC voltage of the battery B2 is converted into an AC voltage, and then, the converted AC voltage is applied to the primary winding 200 of the transformer 20. Upon application of the AC voltage to the primary winding 200, a stepped down AC voltage is outputted from the secondary windings 201, 202 of the transformer 20. In the output-side circuit 22, the AC voltage outputted from the secondary windings 201, 102 is converted into a DC voltage and is supplied to the electronic device S2.

FIG. 7 shows the timing chart in a case where a timing for an input current of the input-side circuit 11 to reach a current reference value is much earlier than rising timing of the reference signals CLK2, CLK3. In this case, even when a delay of the input current detecting section 233, an on-delay, or an off-delay occurs, an input current flowing prior to these rising timing cannot be outputted from the input current detecting section 133 after these rising timing.

FIG. 8 shows the timing chart in a case where a timing for an input current of the input-side circuit 11 to reach a current reference value is close to the rising timing of the reference signals CLK2, CLK3. In this case, an input current flowing prior to these rising timing may be outputted from the input current detecting section 233 after these rising timing.

However, as shown in FIG. 6, the DC-DC converter 2 includes the mask circuits 235*a*, 235*b* and the mask signal generating circuit 238. As shown in FIG. 8, in the mask signal generating circuit 238 generates the mask signals MSK1, MSK2 and outputs the generated mask signals MSK1, MSK2. The mask signal MSK1 is generated and outputted so as to: (i) become low level at a rising timing of the reference signal CLK4; and (ii) become high level after a period obtained as a sum of the predetermined pre-mask time T_pre, T0/2 and the predetermined post-mask time T_post (T_pre+T0/2+T_post) has elapsed. The mask signal MSK2 is generated and outputted such that a phase of mask signal MSK2 is shifted by T0/2 with respect to a phase of the mask signal MSK1.

As shown in FIG. 8, while the mask signals MSK1, MSK2 are low level, the mask circuits 235a, 235b shown in FIG. 6 force an output voltage of the comparator 234 to be set to 0 V and output this as the reset signals RST1, RST2. As a result, the reset signals RST1, RST2 are forced to be set to 0 V during: (i) a period of the pre-mask time T_pre before a rising timing of the respective reference signals CLK2, CLK3; and (ii) a period of the post-mask time T_post after a rising timing of the respective reference signals CLK2, CLK3. This makes it possible for the PWM signal generating section 237b and the driving circuit 239b not to turn the switches 212, 213 off in synchronization with the reset signals RST1, RST2 during these periods. This can prevent a switching operation which is different from the desired switching operation as shown in FIG. 4 and which is caused by delays of the input current detecting section 233, the comparator 234, the PWM signal generating section 237b, the driving circuit 239b, and the switches. Thus, even when these delays occur, a fluctuation of, e.g., an input current can be suppressed.

Next, effects of the second exemplary embodiment are described below.

According to the second exemplary embodiment, it is possible to prevent an occurrence of a switching operation which is different from the desired switching operation and is caused by delays of the input current detecting section 233 and so on, in the same manner as the first exemplary embodiment. This can suppress a fluctuation of, e.g., the input current, even when these delays occur.

According to the second exemplary embodiment, the mask circuits 235a, 235b force the reset signals RST1, RST2 to be set to low level during; (i) a period of the pre-mask time T_pre before a rising timing of the respective reference signals CLK2, CLK3; and (ii) a period of the post-mask time T_post after a rising timing of the respective reference signals CLK2, CLK3. This can reliably prevent the switches 212, 213 from being turned off in synchronization with the reset signals RST1, RST2 during a period (predetermined time) including the pre-mask time T_pre and the post-mask time T_post (T_pre+T_post) before and after an output timing of the reference signals CLK2, CLK3.

According to the second exemplary embodiment, the mask signal generating section 238 generates mask signals MSK1, MSK2 on the basis of a predetermined pre-mask time T_pre and a predetermined post-mask time T_post, and outputs the generated mask signals MSK1, MSK2. Based on the mask signals MSK1, MSK2, the mask circuits 235a, 235b force an output voltage of the comparator 234 to be set to 0 V. Thus, the output voltage of the comparator 234 can be forced to be set to 0 V during a period (predetermined time) including the pre-mask time T_pre and the post-mask time T_post (T_pre+T_post) before and after an output timing of the reference signals CLK2, CLK3.

Third Exemplary Embodiment

Next, a DC-DC converter according to a third exemplary embodiment is described below. In the first exemplary embodiment, the DC-DC converter includes a comparator configured by a double system (i.e., two comparators), but in the third exemplary embodiment, the DC-DC converter includes a comparator configured by a single system (i.e., one comparator). This DC-DC converter has the same configuration as that of the first exemplary embodiment except for a comparator, a mask circuit, a reference signal generating section, and a mask signal generating section.

Figure 9:
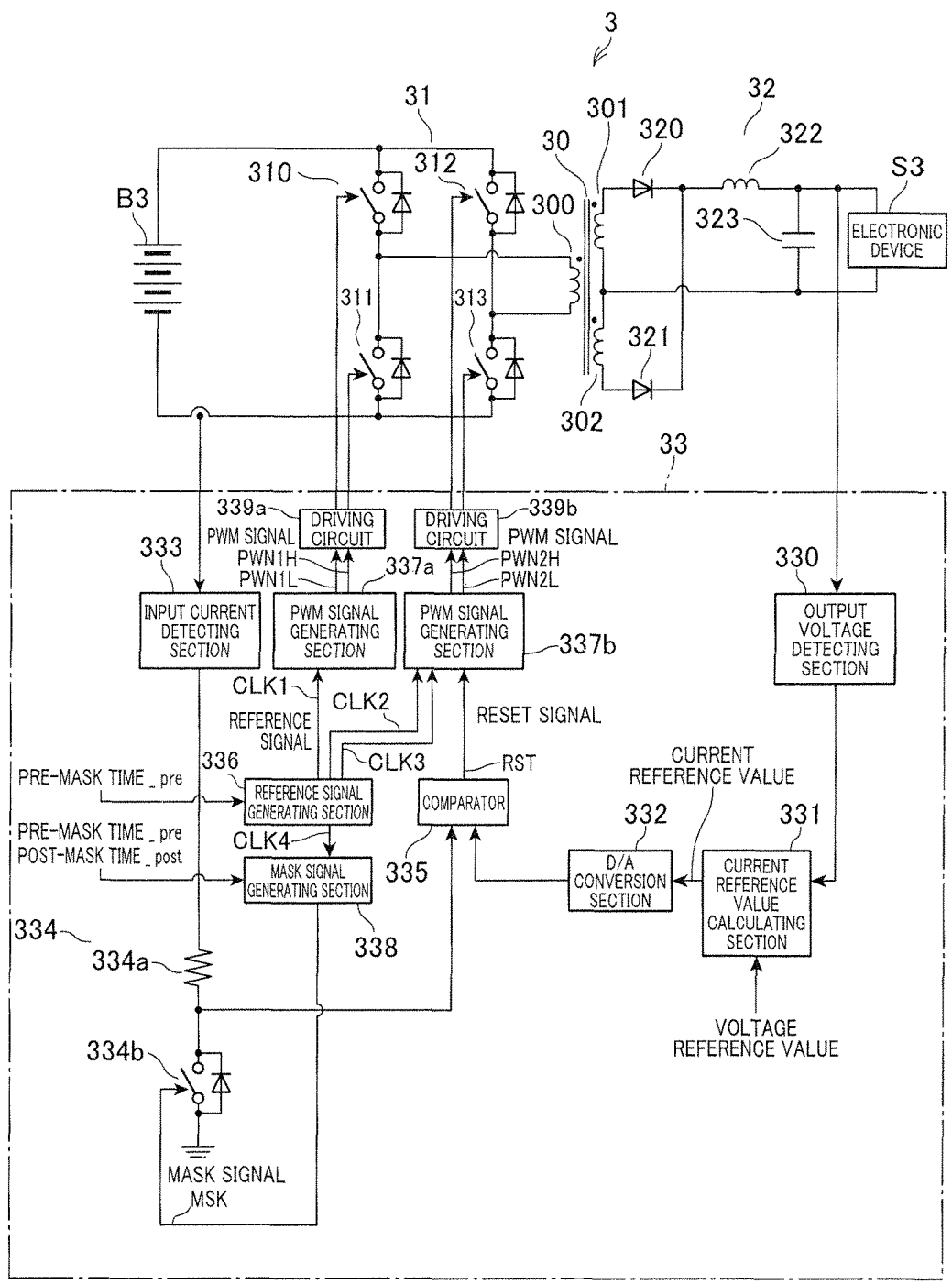
FIG. 9 is a circuit diagram showing a DC-DC converter acting as a power converter according to a third exemplary embodiment of the present invention.

With reference to FIG. 9, a configuration of the DC-DC converter of the third exemplary embodiment is described below. FIG. 6 is a circuit diagram of the DC-DC converter of the second exemplary embodiment.

A DC-DC converter (power converter) 3 shown in FIG. 9 is configured by a full-bridge converter that steps down a voltage outputted from a battery B3 in an isolated manner and supplies the stepped down voltage to an electronic device S3 mounted in a vehicle. This DC-DC converter 3 includes a transformer 30, an input-side circuit (switch circuit) 31, an output-side circuit 32, and a control circuit 33.

The transformer 30 includes a primary winding 300 and secondary windings 301, 302. The transformer 30 has the same configuration as the transformer 10 of the first exemplary embodiment. The input-side circuit 31 includes switches 310 to 313. This input-side circuit 31 has the same configuration as the input-side circuit 11 of the first exemplary embodiment. The output-side circuit 32 includes diodes 320, 321, an inductor 322, and a capacitor 323. This output-side circuit 32 has the same configuration as the output-side circuit 12 of the first exemplary embodiment.

The control circuit 33 includes an output voltage detecting section 330, a current reference value calculating section 331, a D/A conversion section 332, an input current detecting section (configuring a part of a current detector or current detecting means) 333, a mask circuit (configuring a part of a current detector or current detecting means and a mask unit or mask means) 334, a comparator (configuring a reset signal generator or reset signal generating means) 335, a reference signal generating section (configuring a reference signal generator or reference signal generating means) 336, two PWM signal generating sections (configuring a part of a driving unit or driving means) 337a, 337b, a mask signal generating section (configuring a part of a current detector or current detecting means and a mask signal generator or mask signal generating means) 338, and two driving circuits (configuring a part of a driving unit or driving means) 339a, 339b.

The output voltage detecting section 330, the current reference value calculating section 331, the D/A conversion section 332, the input current detecting section 333, the PWM signal generating sections 337a, 337b, and the driving circuits 339a, 339b have the same configuration as the output voltage detecting section 130, the current reference value calculating section 131, the D/A conversion section 132, the input current detecting section 133, the PWM signal generating sections 137a, 137b, and the driving circuits 139a, 139b of the first exemplary embodiment.

The mask circuit 334 is a circuit that forces an output voltage of the input current detecting section 333 to be set to 0 V on the basis of mask signals MSK outputted from the mask signal generating section 338 described below. This mask circuit 334 includes a resistor 334a and a switch 334b. One end of the resistor 334a is connected to the input current detecting section 333, and the other end thereof is connected to one end of the switch 334. The other end of the switch 334 is electrically grounded. A connection point between the resistor 334a and the switch 334b is connected to the comparator 335. A control end of the switch 334b is connected to the mask signal generating section 338.

The comparator 335 is an element that compares an output voltage of the D/A conversion section 332 with an output voltage of the mask circuit 334, produces a reset signal RST depending on its comparison result, and outputs the produced reset signal RST. The comparator 334 has two input ends and an output end. One of the input ends is connected to the D/A conversion section 332, and the other of the input ends is connected to a connection point between the resistor 334a and the switch 334b. The output end is connected to the PWM signal generating section 337b.

The reference signal generating section 336 is a block that generates reference signals CLK1 to CLK3 at each predetermined period, generates a reference signal CLK4 at each predetermined period on the basis of a predetermined pre-mask time (first predetermined time) T_pre, and outputs the generated reference signals CLK1 to CLK4. Here, the reference signal CLK1 is a signal for generating PWM signals PWM1H, PWM1L as described below, the reference signal CLK2 is a signal for generating a PWM signal PWM2H as described below, the reference signal CLK3 is a signal for generating a PWM signal PWM2L as described below, and the reference signal CLK4 is a signal for generating mask signals MSK as described below. The pre-mask time T_pre is determined by delay times in the input current detecting section 333, the mask circuit 334, the comparator 335, the PWM signal generating section 337b, the driving circuit 339b, and the switches 310 to 313. This reference signal generating section 336 is connected to the PWM signal generating sections 337a, 337b and the mask signal generating section 338.

The PWM signal generating sections 337a, 337b have the same configuration as the PWM signal generating sections 137a, 137b of the first exemplary embodiment.

The mask signal generating section 338 is a block that generates a mask signal MSK on the basis of the reference signal CLK4 outputted from the reference signal generating section 336, a predetermined pre-mask time (first predetermined time) T_pre and a predetermined post-mask time (second predetermined time) T_post, and outputs the generated mask signals MSK1, MSK2. Here, the post-mask time T_post is determined by delay times in the input current detecting section 333, the mask circuit 334, the comparator 335, the PWM signal generating section 337b, the driving circuit 339b and the switches 310 to 313. This mask signal generating section 338 is connected to the reference signal generating section 336 and the control end of the switch 334b.

The driving circuits 339a, 339b have the same configuration as the driving circuits 139a, 139b of the first exemplary embodiment.

Figure 10:
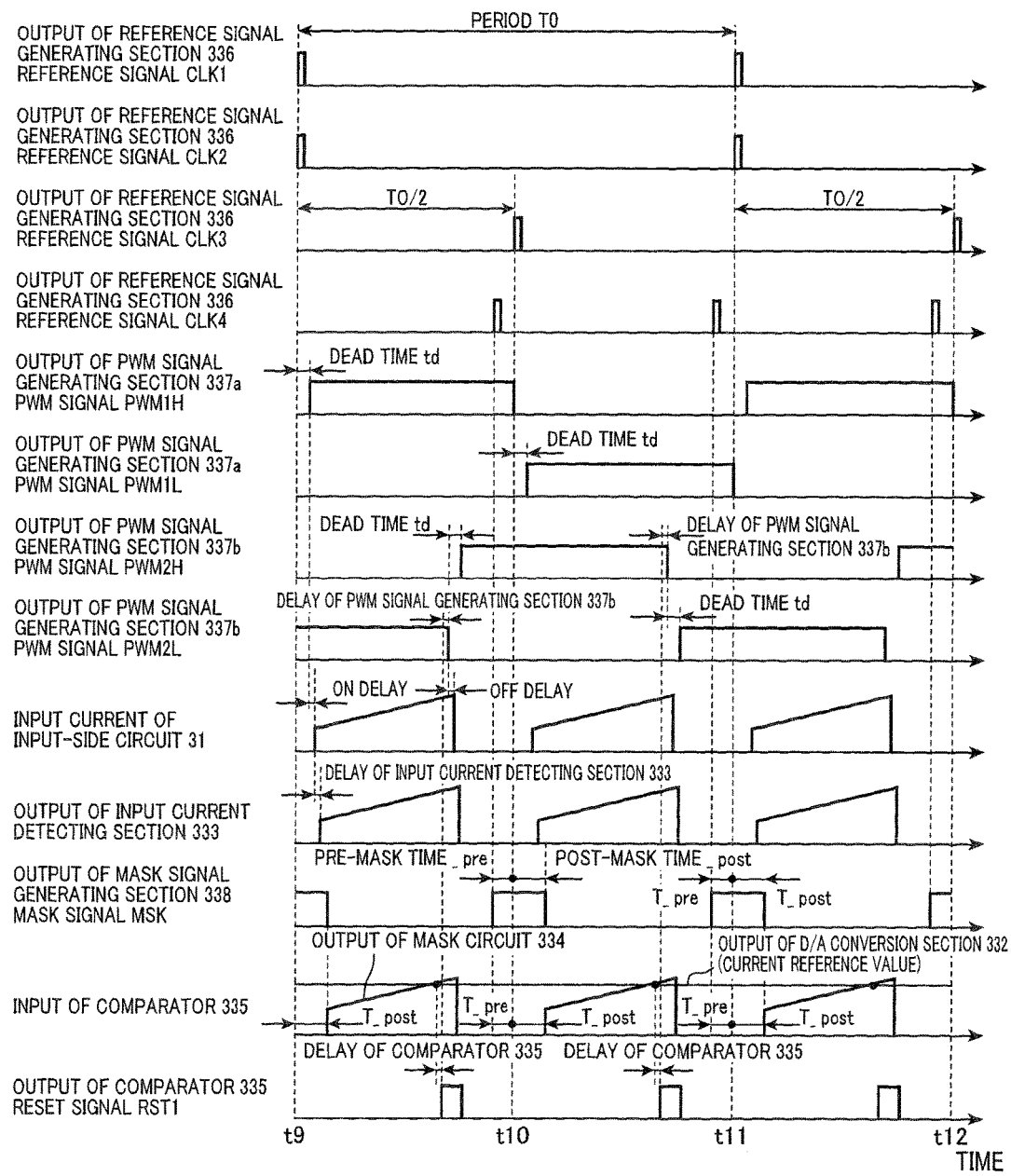
FIG. 10 is a timing chart showing operation of the DC-DC converter of FIG. 9.

Next, with reference to FIGS. 9 and 10, operation of the DC-DC converter 3 is described below. FIG. 10 is a timing chart for explaining the operation of the DC-DC converter 3 in FIG. 9.

The output voltage detecting section 330 shown in FIG. 9 detects an output voltage of the output-side circuit 32 which is supplied to the electronic device S3, converts the detected voltage into a corresponding predetermined voltage, and outputs the converted voltage.

The current reference value calculating section 331 converts an output voltage of the output voltage detecting section 330 into a digital value, determines a current reference value by carrying out proportional integral calculation with respect to a deviation between the converted digital value of the output voltage and a voltage reference value which is predetermined as a digital value, and outputs the determined current reference value as a digital value.

The D/A conversion section 332 converts the digital value of the current reference value outputted from the current reference value calculating section 331 into a voltage and outputs the converted voltage.

As shown in FIG. 10, the reference signal generating section 336 shown in FIG. 9 generates reference signals CLK1 to CLK3 which are the same as that generated by the reference signal generating section 136 of the first exemplary embodiment, and output the generated reference signals CLK1 to CLK3. Further, the reference signal generating section 336 generates a pulse-like reference signal CLK4 which becomes high level at each T/0 which is different from that of the first exemplary embodiment and at a timing which is the predetermined pre-mask time T_pre earlier than an output timing of the reference signal CLK3, and outputs the generated pulse-like reference signal CLK4.

The mask signal generating section 338 shown in FIG. 1 generates a mask signal MSK on the basis of the reference signal CLK4 outputted from the reference signal generating section 336, a predetermined pre-mask time T_pre and a predetermined post-mask time T_post, and outputs the generated mask signal MSK. Specifically, as shown in FIG. 10, this mask signal generating section 138 generates a mask signal MSK which becomes high level at a rising timing of the reference signal CLK4 and becomes low level after a period obtained as a sum of the predetermined pre-mask time T_pre and the predetermined post-mask time T_post (T_pre+T_post) has elapsed, and outputs the generated mask signal MSK.

The input voltage detecting section 333 shown in FIG. 9 detects an input current of the input-side circuit 31 inputted from the battery B3, converts the detected current into a corresponding predetermined voltage, and outputs the converted voltage.

As shown in FIG. 10, while the mask signal MSK is high level, the mask circuit 334 turns the switch 334b on, forces an output voltage of the input current detecting section 333 to be set to 0 V, and outputs this to the comparator 335. As a result, the output voltage of the input current detecting section 333 is forced to be set to 0 V during: (i) a period of the pre-mask time T_pre before a rising timing of the respective reference signals CLK2, CLK3; and (ii) a period of the post-mask time T_post after a rising timing of the respective reference signals CLK2, CLK3.

As shown in FIG. 10, the comparator 335 shown in FIG. 9 produces a reset signal RST which becomes high level when the output voltage of the mask circuit 334 is larger than the output voltage of the D/A conversion section 332.

As shown in FIG. 10, the PWM signal generating section 337a shown in FIG. 9 generates PWM signals PWM1H, PWM1L and outputs the generated PWM signals PWM1H, PWM1L.

Here, the PWM signal PWM1H is generated and outputted so as to: (i) be synchronized with time t9 which is a rising timing of the reference signal CLK1; (ii) become high level after a dead time td has elapsed from time t9; and (iii) become low level in synchronization with time t10 after T0/2 (one-half of the period T0) has elapsed from time t9.

The PWM signal PWM1L is generated and outputted so as to: (i) be synchronized with time t10; (ii) become high level after a dead time td has elapsed from time t10; and (iii) become low level in synchronization with time t11 which is a rising timing of the next reference signal CLK1. After that, in the same way, the PWM signals PWM1H, PWM1L are generated and outputted.

As shown in FIG. 10, the PWM signal generating section 337b shown in FIG. 9 generates PWM signals PWM2H, PWM2L and outputs the generated PWM signals PWM2H, PWM2L.

Here, the PWM signal PWM2H is generated and outputted so as to: (i) when the reset signal RST is outputted before time t10, become high level after a dead time td has elapsed from a falling timing of the PWM signal PWM2L which becomes low level in synchronization with a rising timing of the reset signal RST; (ii) when the reset signal RST is not outputted before time t10, become high level after a dead time td has elapsed from time t10; (iii) when the reset signal RST is outputted before time t11, become low level in synchronization with a rising timing of the reset signal RST; and (iv) when the reset signal RST is not outputted before time t11, become low level in synchronization with time t11.

The PWM signal PWM2L is generated and outputted so as to: (i) when the reset signal RST is outputted before time t11, become high level after a dead time td has elapsed from a falling timing of the PWM signal PWM2H which becomes low level in synchronization with a rising timing of the reset signal RST; (ii) when the reset signal RST is not outputted before time t11, become high level after a dead time td has elapsed from time t11; (iii) when the reset signal RST is outputted before time t12 after T0/2 has elapsed from time t11, become low level in synchronization with a rising timing of the reset signal RST; and (iv) when the reset signal RST2 is not outputted before time t12, become low level in synchronization with time t12.

After that, in the same way, the PWM signals PWM2H, PWM2L are generated and outputted.

The driving circuit 339a shown in FIG. 9 switches the switches 310, 311 on and off on the basis of the PWM signals PWM1H, PWM1L outputted from the PWM signal generating section 337a. Specifically, the switch 310 is turned on when the PWM signal PWM1H is high level, and the switch 311 is turned on when the PWM signal PWM1L is high level.

The driving circuit 339b shown in FIG. 9 switches the switches 312, 313 on and off on the basis of the PWM signals PWM2H, PWM2L outputted from the PWM signal generating section 337b. Specifically, the switch 312 is turned on when the PWM signal PWM2H is high level, and the switch 313 is turned on when the PWM signal PWM2L is high level.

Thus, a DC voltage of the battery B3 is converted into an AC voltage, and then, the converted AC voltage is applied to the primary winding 300 of the transformer 30. Upon application of the AC voltage to the primary winding 300, a stepped down AC voltage is outputted from the secondary windings 301, 302 of the transformer 20. In the output-side circuit 32, the AC voltage outputted from the secondary windings 301, 302 is converted into a DC voltage and is supplied to the electronic device S3.

As shown in FIG. 9, the DC-DC converter 3 includes the mask circuit 334 and the mask signal generating circuit 338. As shown in FIG. 10, in the mask signal generating circuit 338 generates the mask signal MSK and outputs the generated mask signal MSK. The mask signal MSK is generated and outputted so as to: (i) become high level at a rising timing of the reference signal CLK4; and (ii) becomes low level after a period obtained as a sum of the predetermined pre-mask time T_pre and the predetermined post-mask time T_post (T_pre+T_post) has elapsed.

As shown in FIG. 10, while the mask signal MSK is high level, the mask circuit 334 shown in FIG. 6 forces an output voltage of the input current detecting section 333 to be set to 0 V. As a result, the output voltage of the input current detecting section 333 is forced to be set to 0 V during: (i) a period of the pre-mask time T_pre before a rising timing of the reference signal CLK3; and (ii) a period of the post-mask time T_post after a rising timing of the reference signal CLK3.

This enables the comparator 335 to set the reset signal RST to low level during these periods. This makes it possible for the PWM signal generating section 337b and the driving circuit 339b not to turn the switches 312, 313 off in synchronization with the reset signal RST during these periods. This can prevent a switching operation which is different from the desired switching operation and which is caused by delays of the input current detecting section 333, the comparator 335, the PWM signal generating section 337b, the driving circuit 339b, and the switches. Thus, even when these delays occur, a fluctuation of, e.g., an input current can be suppressed.

Next, effects of the third exemplary embodiment are described below.

According to the third exemplary embodiment, it is possible to prevent an occurrence of a switching operation which is different from the desired switching operation and is caused by delays of the input current detecting section 333 and so on, in the same manner as the first exemplary embodiment. This can suppress a fluctuation of, e.g., the input current, even when these delays occur.

Fourth Exemplary Embodiment

Next, a DC-DC converter according to a fourth exemplary embodiment is described below. This DC-DC converter does not use the phase shift control, in comparison to that of the first exemplary embodiment using the phase shift control. This DC-DC converter has the same configuration as that of the first exemplary embodiment except for a reference signal generating section, a PMW signal generating section, a mask signal generating section, and a driving section.

Figure 11:
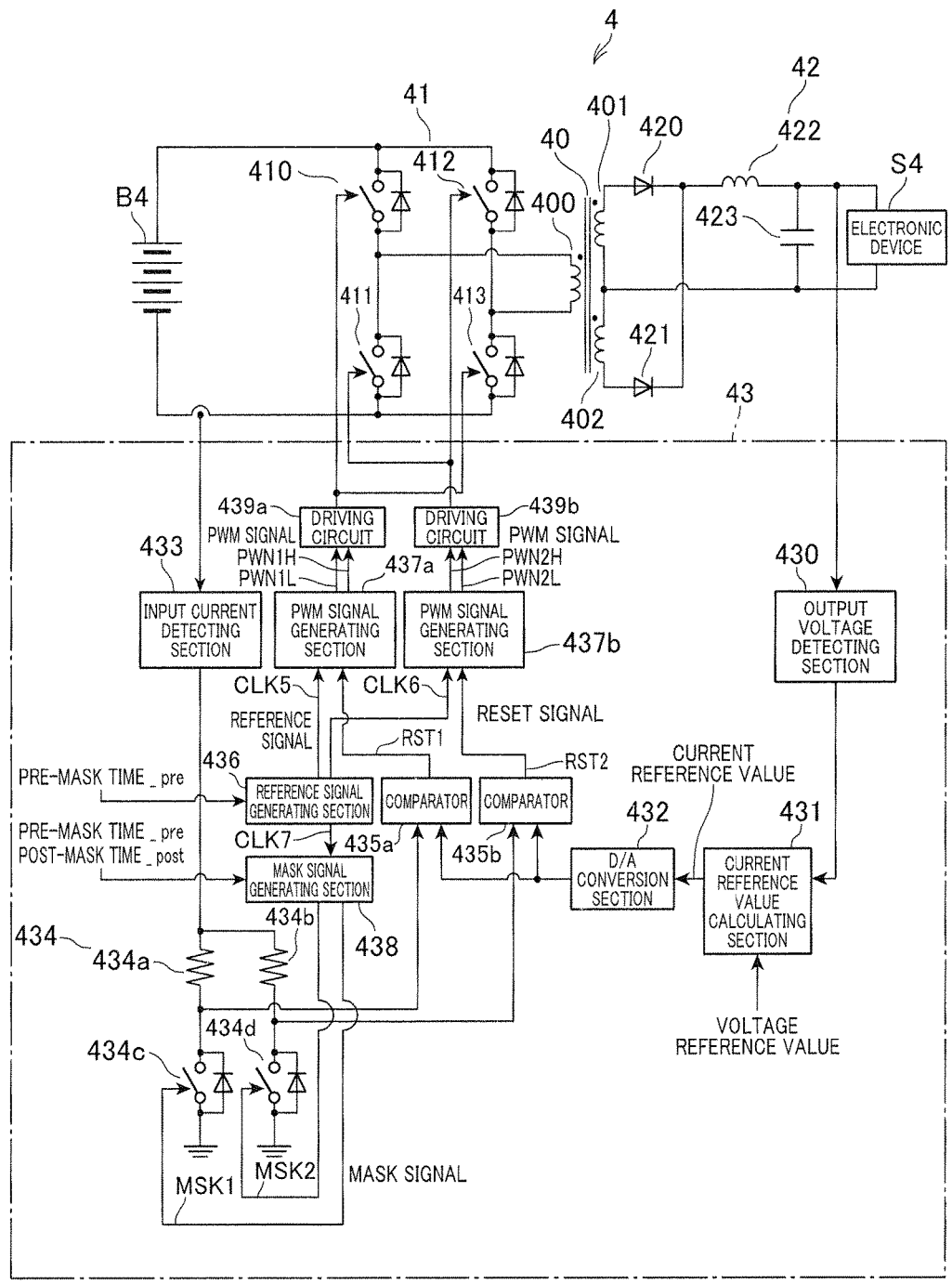
FIG. 11 is a circuit diagram showing a DC-DC converter acting as a power converter according to a fourth exemplary embodiment of the present invention.

With reference to FIG. 11, a configuration of the DC-DC converter of the fourth exemplary embodiment is described below. FIG. 11 is a circuit diagram of the DC-DC converter of the fourth exemplary embodiment.

A DC-DC converter (power converter) 4 shown in FIG. 11 is configured by a full-bridge converter that steps down a voltage outputted from a battery B4 in an isolated manner and supplies the stepped down voltage to an electronic device S4 mounted in a vehicle. This DC-DC converter 4 includes a transformer 40, an input-side circuit (switch circuit) 41, an output-side circuit 42, and a control circuit 43.

The transformer 40 includes a primary winding 400 and secondary windings 401, 402. This transformer 40 has the same configuration as the transformer 10 of the first exemplary embodiment. The input-side circuit 41 includes switches 410 to 413. This input-side circuit 41 has the same configuration as the input-side circuit 11 of the first exemplary embodiment. The output-side circuit 42 includes diodes 420, 421, an inductor 422, and a capacitor 423. This output-side circuit 42 has the same configuration as the output-side circuit 12 of the first exemplary embodiment.

The control circuit 43 includes an output voltage detecting section 430, a current reference value calculating section 431, a D/A conversion section 432, an input current detecting section (configuring a part of a current detector or current detecting means) 433, a mask circuit (configuring a part of a current detector or current detecting means and a mask unit or mask means) 434, two comparators (configuring a reset signal generator or reset signal generating means)

435a, 435b, a reference signal generating section (configuring a reference signal generator or reference signal generating means) 436, two PWM signal generating sections (configuring a part of a driving unit or driving means) 437a, 437b, a mask signal generating section (configuring a part of a current detector or current detecting means and a mask signal generator or mask signal generating means) 438, and two driving circuits (configuring a part of a driving unit or driving means) 439a, 439b.

The output voltage detecting section 430, the current reference value calculating section 431, the D/A conversion section 432, the input current detecting section 433, the mask circuit 434 (including two resistors 434a, 434b and two switches 434c, 434d), and the comparators 435a, 435b have the same configuration as the output voltage detecting section 130, the current reference value calculating section 131, the D/A conversion section 132, the input current detecting section 133, the mask circuit 134 (including two resistors 134a, 134b and two switches 134c, 134d), and the comparators 135a, 135b of the first exemplary embodiment.

The reference signal generating section 436 is a block that generates reference signals CLK5, CLK6 at each predetermined period, generates a reference signal CLK7 at each predetermined period on the basis of a predetermined pre-mask time (first predetermined time) T_pre, and outputs the generated reference signals CLK5 to CLK7. Here, the reference signal CLK5 is a signal for generating a PWM signal PWM1 as described below, the reference signal CLK6 is a signal for generating a PWM signal PWM2 as described below, and the reference signal CLK7 is a signal for generating mask signals MSK1, MSK2 as described below. The pre-mask time T_pre is determined by delay times in the input current detecting section 433, the mask circuit 434, the comparator 435a, 435b, the PWM signal generating section 437b, the driving circuit 439b, and the switches 410 to 413. This reference signal generating section 436 is connected to the PWM signal generating sections 437a, 437b and the mask signal generating section 438.

The PWM signal generating section 437a is a block that generates a PWM signal PWM1 for switching the switches 410, 413 on and off on the basis of a reference signal CLK5 outputted from the reference signal generating section 436 and a reset signal RST1 outputted from the comparator 435a, and outputs the generated PWM signal PWM1. This signal generating section 437a is connected to the reference signal generating section 436, the comparator 435a, and the driving circuit 439a.

The PWM signal generating section 437b is a block that generates a PWM signal PWM2 for switching the switches 411, 412 on and off on the basis of a reference signal CLK6 outputted from the reference signal generating section 436 and a reset signal RST2 outputted from the comparator 435b, and outputs the generated PWM signal PWM2. This signal generating section 437b is connected to the reference signal generating section 436, the comparator 435b, and the driving circuit 439b.

The mask signal generating section 438 is a block that generates mask signals MSK1, MSK2 on the basis of a reference signal CLK7 outputted from the reference signal generating section 436, a predetermined pre-mask time (first predetermined time) T_pre and a predetermined post-mask time (second predetermined time) T_post, and outputs the generated mask signals MSK1, MSK2. Here, the post-mask time T_post is determined by delay times in the input current detecting section 433, the mask circuit 434, the comparators 435a, 435b, the PWM signal generating section 437b, the driving circuit 139b, and the switches 410 to 413. This mask signal generating section 438 is connected to the reference signal generating section 436 and a control end of the respective switches 434c, 434d of the mask circuit 434.

The respective driving circuits 439a, 439b are circuits that switch the switches 410 to 413 on and off on the basis of the PWM signals PWM1, PWM2 outputted from the PWM signal generating sections 437a, 437b. The respective driving circuits 439a, 439b are connected to the respective PWM signal generating sections 437a, 437b. The driving circuit 139a is connected to a control end of the respective switches 410, 413. The driving circuit 439b is connected to a control end of the respective switches 411, 412.

Figure 12:
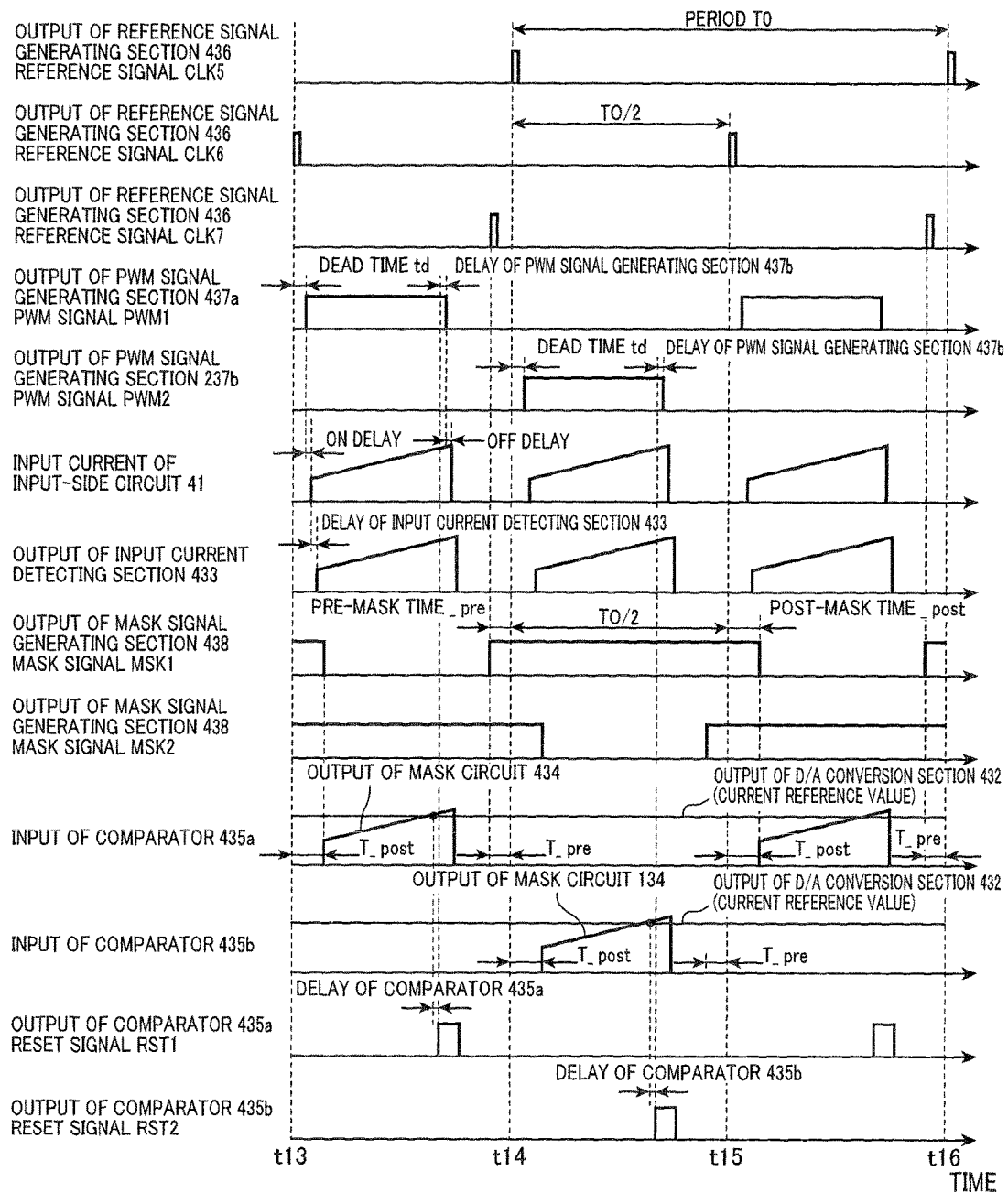
FIG. 12 is a timing chart showing operation of the DC-DC converter of FIG. 11.

Next, with reference to FIGS. 11 and 12, operation of the DC-DC converter 4 is described below. FIG. 12 is a timing chart for explaining the operation of the DC-DC converter 4 in FIG. 11.

The output voltage detecting section 430 shown in FIG. 11 detects an output voltage of the output-side circuit 32 which is supplied to the electronic device S4, converts the detected voltage into a corresponding predetermined voltage, and outputs the converted voltage.

The current reference value calculating section 431 converts an output voltage of the output voltage detecting section 430 into a digital value, determines a current reference value by carrying out proportional integral calculation with respect to a deviation between the converted digital value of the output voltage and a voltage reference value which is predetermined as a digital value, and outputs the determined current reference value as a digital value.

The D/A conversion section 432 converts the digital value of the current reference value outputted from the current reference value calculating section 431 into a voltage and outputs the converted voltage.

The reference signal generating section 436 shown in FIG. 11 generates pulse-like reference signals CLK5 to CLK7 and outputs the generated reference signals CLK5 to CLK7. Specifically, as shown in FIG. 12, the pulse-like reference signal CLK5 is generated and outputted so as to become high level at each period T0. The pulse-like reference signal CLK6 is generated and outputted so as to become high level at each period T0 and at a timing in which a phase of the reference signal CLK6 is shifted by T0/2 (one-half of the period T0) with respect to an output timing of the reference signal CLK5. The pulse-like reference signal CLK7 is generated and outputted so as to become high level at each period T0 and at a timing which is a predetermined pre-mask time T_pre earlier than an output timing of the reference signal CLK5.

The mask signal generating section 438 shown in FIG. 11 generates mask signals MSK1, MSK2 on the basis of the reference signal CLK7 outputted from the reference signal generating section 436, a predetermined pre-mask time T_pre and a predetermined post-mask time T_post, and outputs the generated mask signals MSK1, MSK2. Specifically, as shown in FIG. 12, the mask signal MSK1 is generated and outputted so as to become high level at a rising timing of the reference signal CLK7 and becomes low level after a period obtained as a sum of the predetermined pre-mask time T_pre, T0/2 and the predetermined post-mask time T_post (T_pre+T0/2+T_post) has elapsed. The mask signal MSK2 is generated and outputted such that a phase of mask signal MSK2 is shifted by T0/2 with respect to a phase of the mask signal MSK1.

The input voltage detecting section 433 shown in FIG. 11 detects an input current of the input-side circuit 41 inputted from the battery B4, converts the detected current into a corresponding predetermined voltage, and outputs the converted voltage.

As shown in FIG. 2, while the mask signal MSK1 is high level, the mask circuit 434 turns the switch 434c on, and then, forces an output voltage of the input current detecting section 433 to be set to 0 V and outputs this to the comparator 435a. While the mask signal MSK2 is high level, the mask circuit 434 turns the switch 434d on, and then, forces an output voltage of the input current detecting section 433 to be set to 0 V and outputs this to the comparator 135b. As a result, the output voltage of the input current detecting section 433 is forced to be set to 0 V during: (i) a period of the pre-mask time T_pre before a rising timing of the reference signal CLK5; and (ii) a period of the post-mask time T_post after a rising timing of the reference signal CLK5.

The comparator 435a shown in FIG. 11 produces a reset signal RST1 on the basis of an output voltage of the D/A conversion section 432 and an output voltage of the mask circuit 434, and outputs the produced reset signal RST1. Specifically, as shown in FIG. 12, the reset signal RST1 is produced and outputted so as to become high level when an output voltage of the mask circuit 434 is larger than an output voltage of the D/A conversion section 432.

The comparator 435b produces a reset signal RST2 on the basis of an output voltage of the D/A conversion section 432 and an output voltage of the mask circuit 434, and outputs the produced reset signal RST2. Specifically, as shown in FIG. 12, the reset signal RST2 is produced and outputted so as to become high level when an output voltage of the mask circuit 434 is larger than an output voltage of the D/A conversion section 432.

The PWM signal generating section 437a shown in FIG. 11 generates the PWM signal PWM1 and outputs the generated PWM signal PWM1. As shown in FIG. 12, the PWM signal PWM1 is generated and outputted so as to: (i) be synchronized with time t13 which is T0/2 earlier than a rising timing of the reference signal CLK5; (ii) become high level after a dead time td has elapsed from time t13; (iii) when the reset signal RST1 is outputted before time t14 which is a rising timing of the reference signal CLK5, become low level in synchronization with the reset signal RST1; and (iv) when the reset signal RST1 is not outputted before time t14, become low level in synchronization with time t14. After that, in the same way, the PWM signal PWM1 is generated and outputted.

The PWM signal generating section 437b shown in FIG. 11 generates the PWM signal PWM1 and outputs the generated PWM signal PWM1. As shown in FIG. 12, the PWM signal PWM1 is generated and outputted so as to: (i) be synchronized with time t14 which is T0/2 earlier than a rising timing of the reference signal CLK6; (ii) become high level after a dead time td has elapsed from time t14; (iii) when the reset signal RST2 is outputted before time t15 which is a rising timing of the reference signal CLK6, become low level in synchronization with the reset signal RST2; and (iv) when the reset signal RST2 is not outputted before time t15, become low level in synchronization with time t15. After that, in the same way, the PWM signal PWM2 is generated and outputted.

The driving circuit 439a shown in FIG. 11 switches the switches 410, 413 on and off on the basis of the PWM signal PWM1 outputted from the PWM signal generating section 437a. Specifically, the switches 410, 423 are turned on when the PWM signal PWM1 is high level.

The driving circuit 439b shown in FIG. 11 switches the switches 411, 412 on and off on the basis of the PWM signal PWM2 outputted from the PWM signal generating section 437b. Specifically, the switches 411, 412 are turned on when the PWM signal PWM2 is high level.

Thus, a DC voltage of the battery B4 is converted into an AC voltage, and then, the converted AC voltage is applied to the primary winding 400 of the transformer 40. Upon application of the AC voltage to the primary winding 400, a stepped down AC voltage is outputted from the secondary windings 401, 402 of the transformer 40. In the output-side circuit 42, the AC voltage outputted from the secondary windings 401, 402 is converted into a DC voltage and is supplied to the electronic device S4.

As shown in FIG. 11, the DC-DC converter 4 includes the mask circuit 434 and the mask signal generating circuit 438. As shown in FIG. 12, the mask signal generating circuit 438 generates the mask signals MSK1, MSK2 and outputs the generated mask signals MSK1, MSK2. The mask signal MSK1 is generated and outputted so as to: (i) become high level at a rising timing of the reference signal CLK7; and (ii) become low level after a period obtained as a sum of the predetermined pre-mask time T_pre, T0/2 and the predetermined post-mask time T_post (T_pre+T0/2+T_post) has elapsed. The mask signal MSK2 is generated and outputted such that a phase of the mask signal MSK2 is shifted by T0/2 with respect to a phase of the mask signal MSK1.

As shown in FIG. 12, while the mask signal MSK1 is high level, the mask circuit 434 shown in FIG. 11 forces an output voltage of the input current detecting section 433 to be set to 0 V, and outputs this to the comparator 435a. While the mask signal MSK2 is high level, the mask circuit 434 forces an output voltage of the input current detecting section 433 to be set to 0 V, and outputs this to the comparator 435b.

As a result, the output voltage of the input current detecting section 433 is forced to be set to 0 V during: (i) a period of the pre-mask time T_pre before a rising timing of the respective reference signals CLK5, CLK6; and (ii) a period of the post-mask time T_post after a rising timing of the respective reference signals CLK5, CLK6.

This enables the comparators 435a, 435b to set the reset signals RST1, RST2 to low level during these periods. This makes it possible for the PWM signal generating sections 437a, 437b and the driving circuits 439a, 439b not to turn the switches 112, 113 off in synchronization with the reset signals RST1, RST2 during these periods. This can prevent a switching operation which is different from the desired switching operation and which is caused by delays of the input current detecting section 433, the comparators 435a, 435b, the PWM signal generating sections 437a, 437b, the driving circuits 439a, 439b, and the switches. Thus, even when these delays occur, a fluctuation of, e.g., an input current can be suppressed.

Next, effects of the fourth exemplary embodiment are described below.

According to the fourth exemplary embodiment, it is possible to prevent an occurrence of a switching operation which is different from the desired switching operation and is caused by delays of the input current detecting section 433 and so on, in the same manner as the first exemplary embodiment. This can suppress a fluctuation of, e.g., the input current, even when these delays occur.

Modifications

In the first to fourth exemplary embodiments, a power converter according to the present invention is exemplified by a DC-DC converter with a full-bridge configuration of four switches, but is not limited to this. For example, a DC-DC converter with a single switch as shown in FIG. 13 may be also applied as a modification of the exemplary embodiments describe above.

Figure 13:
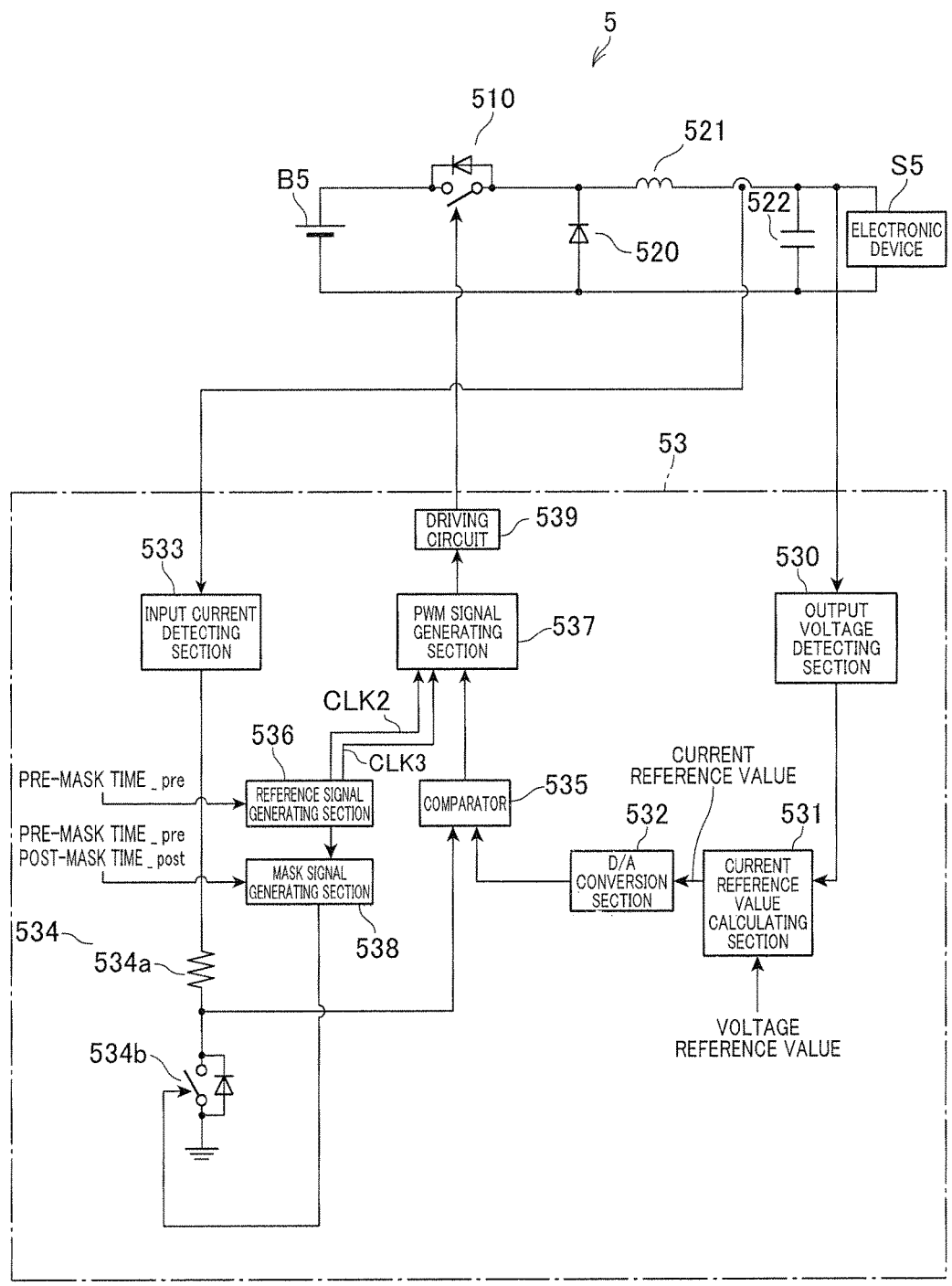
FIG. 13 is a circuit diagram showing a DC-DC converter acting as a power converter according to a modification of the first to fourth exemplary embodiments of the present invention.

FIG. 13 shows a configuration of a DC-DC converter 5 according to this modification. The DC-DC converter 5 is connected between a battery B5 and an electronic device S5, and includes a switch 510, a diode 520, an inductor 521, a capacitor 522, and a control circuit 53. The control circuit 53 includes an output voltage detecting section 530, a current reference value calculating section 531, a D/A conversion section 532, an input current detecting section (configuring a part of a current detector or current detecting means) 533, a mask circuit (configuring a part of a current detector or current detecting means and a mask unit or mask means) 534, a comparator (configuring a reset signal generator or reset signal generating means) 535, a reference signal generating section (configuring a reference signal generator or reference signal generating means) 536, a PWM signal generating sections (configuring a part of a driving unit driving means) 537, a mask signal generating section (configuring a part of a current detector or current detecting means and a mask signal generator or mask signal generating means) 538, and a driving circuit (configuring a part of a driving unit or driving means) 539.

In the control circuit 53, the comparator 535, the PWM signal generating section 537, and the driving circuit 539 are configured by a single system. In the control circuit 53, components or parts corresponding to the PWM signal generating section 337a and the driving circuit 339a shown in FIG. 9 are omitted. The operation and effects of this modification are omitted, because they are identical or similar to that of the exemplary embodiments describe above.

In the first to fourth exemplary embodiments, a power converter according to the present invention is exemplified by a DC-DC converter that controls a switch on the basis of a current flowing in an input-side circuit, but is not limited to this. For example, such a DC-DC converter that controls a switch on the basis of a current flowing in a primary winding of a transformer, or such a DC-DC converter that controls a switch on the basis of a current flowing in an output-side circuit may be also applied as a modification of the exemplary embodiments describe above.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A power converter, comprising:
a reference signal generator configured to generate a reference signal with a predetermined period and output the reference signal;
a current detector configured to detect a current flowing in the power converter and output a value of the detected current;
a reset signal generator configured to generate a reset signal when the value of the detected current is larger than a value of a predetermined current command, and output the reset signal; and
a driving unit configured to drive a switch provided in the power converter such that:
(i) the switch is turned on, and subsequently is turned off:
(a) in synchronization with the reference signal when the reset signal is not outputted before the reference signal is outputted; and (b) in synchronization with the reset signal when the reset signal is outputted before the reference signal is outputted; but
(ii) the switch is not turned off in synchronization with the reset signal during a
predetermined time period including a first predetermined time period before an output timing of the reference signal and a second predetermined time period after the output timing of the reference signal,
the first predetermined time period being a period from a predetermined time point before the output timing of the reference signal to the output timing of the reference signal,
the second predetermined time period being a period from the output timing of the reference signal to a predetermined time point after the output timing of the reference signal, the second predetermined timed period and the first predetermined time period being consecutive periods,
the predetermined time period being expressed by T=T_pre+T_post, where T is the predetermined time period, T_pre is the first predetermined time period, T_post is the second predetermined time period, and T_pre and T_post are consecutive periods,
wherein the reset signal generator is configured to force an output voltage of the reset signal generator to be set to zero during the predetermined time period including the first predetermined time period before the output timing of the reference signal and the second predetermined time period after the output timing of the reference signal.

2. The power converter according to claim 1, wherein the reset signal generator is configured to force an output of the reset signal generator to be set to zero during the predetermined time period including the first predetermined time period before the output timing of the reference signal and the second predetermined time period after the output timing of the reference signal.

3. The power converter according to claim 2, wherein:
the reset signal generator includes:
a mask signal generator configured to generate a mask signal on the basis of a set mask time; and
a mask unit configured to force the output of the reset signal generator to be set to zero on the basis of the mask signal.

4. The power converter according to claim 1, wherein:
the predetermined time period is determined by a delay time of at least one of the current detector, the reset signal generator, and the driving unit.

5. The power converter according to claim 1, wherein:
the switch is a switch circuit configured by a full-bridge connection of four switches which are configured as two sets of two diagonally arranged switches.

6. The power converter according to claim 5, wherein:
in the switch circuit, an on-period of the respective switches diagonally arranged is controlled by a regulation of a phase of an on-period of one of the two diagonally arranged switches within each pair with respect to that of an on-period of the other of the two diagonally arranged switches within the same pair.

7. The power converter according to claim 1, wherein:
the power converter is mounted in a vehicle.

8. A control circuit for a power converter, comprising:
a reference signal generator configured to generate a reference signal with a predetermined period and output the reference signal;
a current detector configured to detect a current flowing in the power converter and output a value of the detected current;
a reset signal generator configured to generate a reset signal when the value of the detected current is larger than a value of a predetermined current command value, and output the reset signal; and
a driving unit configured to drive a switch provided in the power converter such that:
(i) the switch is turned on, and subsequently is turned off: (a) in synchronization with the reference signal when the reset signal is not outputted before the reference signal is outputted; and (b) in synchronization with the reset signal when the reset signal is outputted before the reference signal is outputted; but
(ii) the switch is not turned off in synchronization with the reset signal during a predetermined time period including a first predetermined time period before an output timing of the reference signal and a second predetermined time period after the output timing of the reference signal,
the first predetermined time period being a period from a predetermined time point before the output timing of the reference signal to the output timing of the reference signal,
the second predetermined time period being a period from the output timing of the reference signal to a predetermined time point after the output timing of the reference signal, the second predetermined timed period and the first predetermined time period being consecutive periods,
the predetermined time period being expressed by $T=T\_pre+T\_post$, where T is the predetermined time period, $T\_pre$ is the first predetermined time period, $T\_post$ is the second predetermined time period, and $T\_pre$ and $T\_post$ are consecutive periods,
wherein the reset signal generator is configured to force an output voltage of the reset signal generator to be set to zero during the predetermined time period including the first predetermined time period before the output timing of the reference signal and the second predetermined time period after the output timing of the reference signal.

9. A method of controlling a power converter, comprising:
generating, by a reference signal generator, a reference signal with a predetermined period and output the reference signal;
detecting, by a current detector, a current flowing in the power converter and output a value of the detected current;
generating, by a reset signal generator, a reset signal when the value of the detected current is larger than a value of a predetermined current command, and output the reset signal;
driving, by a driving unit, a switch provided in the power converter such that:
(i) the switch is turned on, and subsequently is turned off: (a) in synchronization with the reference signal when the reset signal is not outputted before the reference signal is outputted; and (b) in synchronization with the reset signal when the reset signal is outputted before the reference signal is outputted; but
(ii) the switch is not turned off in synchronization with the reset signal during a predetermined time period including a first predetermined time period before an output timing of the reference signal and a second predetermined time period after the output timing of the reference signal,
the first predetermined time period being a period from a predetermined time point before the output timing of the reference signal to the output timing of the reference signal,
the second predetermined time period being a period from the output timing of the reference signal to a predetermined time point after the output timing of the reference signal, the second predetermined timed period and the first predetermined time period being consecutive periods,
the predetermined time period being expressed by $T=T\_pre+T\_post$, where T is the predetermined time period, $T\_pre$ is the first predetermined time period, $T\_post$ is the second predetermined time period, and $T\_pre$ and $T\_post$ are consecutive periods,
forcing, by the reset signal generator, an output voltage of the reset signal generator to be set to zero during the predetermined time period including the first predetermined time period before the output timing of the reference signal and the second predetermined time period after the output timing of the reference signal.

* * * * *